(12) United States Patent
Jarugumilli et al.

(10) Patent No.: US 12,033,224 B2
(45) Date of Patent: Jul. 9, 2024

(54) SYSTEMS AND METHODS FOR ENHANCING HARVEST YIELD

(71) Applicant: Monsanto Technology LLC, St. Louis, MO (US)

(72) Inventors: Shrikant Jarugumilli, Dardenne Prairie, MO (US); Hadi Panahi, St. Louis, MO (US); Steven J. Swanton, Wentzville, MO (US); Dustin M. Theis, O'Fallon, IL (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 0 days.

(21) Appl. No.: 17/513,764

(22) Filed: Oct. 28, 2021

(65) Prior Publication Data

US 2022/0138868 A1    May 5, 2022

Related U.S. Application Data

(60) Provisional application No. 63/108,259, filed on Oct. 30, 2020.

(51) Int. Cl.
*G06Q 10/06*    (2023.01)
*G06F 17/10*    (2006.01)
(Continued)

(52) U.S. Cl.
CPC ............ *G06Q 50/02* (2013.01); *G06F 17/10* (2013.01); *G06Q 10/06313* (2013.01)

(58) Field of Classification Search
None
See application file for complete search history.

(56) References Cited

U.S. PATENT DOCUMENTS 10,817,962 B2    10/2020    Karube et al.
2005/0234691 A1*   10/2005    Singh .................... G06Q 10/04
                                                          703/11
(Continued)

FOREIGN PATENT DOCUMENTS

WO    WO-2018/236787 A1    12/2018

OTHER PUBLICATIONS

Bredstrom et al. (Annual planning of harvesting resources in the forest industry, Intl. Trans. in Op. Res. 17 (2010) 155-177 DOI:10.1111/j.1475-3995.2009.00749.x, accepted Oct. 13, 2009).*
(Continued)

*Primary Examiner* — Matthew D Henry
(74) *Attorney, Agent, or Firm* — Harness, Dickey & Pierce, P.L.C.

(57) ABSTRACT

Systems and methods are provided for allocating resources in harvest operations involving multiple fields and multiple pickers. One example computer-implemented method includes retrieving data specific to a harvest project and, for each of multiple stages for a site of the harvest project, determining, via a decision service, multiple potential allocations of the multiple pickers to fields of the site based on the retrieved data and one or more applicable constraints, advancing one or more of the potential allocations based on a determined parameter, and imposing at least one constraint consistent with ones of the one or more advanced potential allocations. The method then includes determining, via the decision service, at least one allocation of the multiple pickers to the multiple fields based on the retrieved data and one or more applicable constraints, compiling and storing a harvest plan for the harvest project, and implementing the harvest plan.

19 Claims, 19 Drawing Sheets

(51) Int. Cl.
   *G06Q 10/0631*   (2023.01)
   *G06Q 50/02*   (2012.01)

(56) References Cited

U.S. PATENT DOCUMENTS

| | | |
|---|---|---|
| 2014/0278619 A1 | 9/2014 | Asai |
| 2016/0026940 A1* | 1/2016 | Johnson ................ A01D 91/00 705/7.11 |
| 2017/0124463 A1 | 5/2017 | Chen et al. |
| 2017/0287082 A1* | 10/2017 | Karube ................ G06Q 50/02 |
| 2018/0232674 A1 | 8/2018 | Bilde |
| 2018/0329618 A1 | 11/2018 | Wieckhorst et al. |
| 2019/0057462 A1 | 2/2019 | Bakke et al. |
| 2020/0402184 A1 | 12/2020 | Dasgupta et al. |
| 2021/0169003 A1 | 6/2021 | Ceglinski et al. |

OTHER PUBLICATIONS

McNeil, S. and Montross, M. "Corn harvesting, handling, drying, and storage." University of Kentucky Cooperative Extension, 2015, pp. 52-58.

* cited by examiner

Model output

Show [10 ▾] entries                                                                                                          Search: [     ]

| Field | Start Harv.Date | End Harv.Date | Harv.Date (model) | Picker | Hybrid | TotalArea | Area Harv. | Total SSU | SSU Harv. | Lateness | Expected Moisture |
|---|---|---|---|---|---|---|---|---|---|---|---|
| 10012 | 09-13 | 09-18 | 09-17 | 3/4 | 1 | 49.2 | 49.2 | 3911.449086865 | 3911.449086865 | 0 | 34 |
| 10015 | 09-04 | 09-09 | 09-04 | 1/2 | 2 | 115.3 | 115.3 | 10522.7408615108 | 10522.7408615108 | 0 | 38 |
| 10016 | 08-25 | 08-30 | 08-28 | 3/4 | 3 | 22.2 | 22.2 | 2106.6090123970 | 2106.6090123970 | 0 | 35 |
| 10018 | 08-25 | 08-30 | 08-25 | 9/10 | 3 | 138.6 | 138.6 | 13201.1262760914 | 13201.1262760914 | 0 | 38 |
| 10019 | 08-25 | 08-30 | 08-28 | 3/4 | 3 | 57.4 | 57.4 | 5523.569663835/3 | 5523.569663835/3 | 0 | 35 |
| 10024 | 09-04 | 09-09 | 09-04 | 3/4 | 3 | 70 | 70 | 6314.7325052321 | 6314.7325052321 | 0 | 38 |
| 10029 | 09-14 | 09-19 | 09-18 | 3/4 | 4 | 59.2 | 59.2 | 5869.2934394084 | 5869.2934394084 | 0 | 34 |
| 10030 | 09-12 | 09-17 | 09-12 | 9/10 | 4 | 146.6 | 146.6 | 13934.4341289749 | 13934.4341289749 | 0 | 38 |
| 10032 | 08-22 | 08-27 | 08-23 | 9/10 | 5 | 237 | 150 | 19905.2853050325 | 12598.2818386281 | 0 | 37 |
| 10032 | 08-22 | 08-27 | 08-24 | 9/10 | 5 | 237 | 87 | 19905.2853050325 | 7307.0034664043/3 | 0 | 36 |

Showing 1 to 10 of 1,607 entries

Previous [1] 2 3 4 5 ... 161 Next

FIG. 9

Show [50 ▼] entries                                    Search: [         ]

| Date | Day of Week | Tmin (C) | TMax (C) | TMax (C) | Narrative |
|---|---|---|---|---|---|
| 08-05 | Thursday | 19 | 25 | 8.65 | Rain Highs 24 to 26C and lows 18 to 20C. |
| 08-06 | Friday | 20 | 29 | 0 | Partly cloudy. Highs 28 to 30C and lows 19 to 21C. |
| 08-07 | Saturday | 22 | 31 | 1 | Mix of sun and clouds. Highs 30 to 32C and lows 21 to 23C. |
| 08-08 | Sunday | 22 | 29 | 14.55 | Scattered thunderstorms possible. Highs 28 to 30C and lows 20 to 22C. |
| 08-09 | Monday | 22 | 32 | 0 | Times of sun and clouds. Highs 31 to 33C and lows 21 to 23C. |
| 08-10 | Tuesday | 22 | 33 | 6.11 | Mix of sun and clouds. Highs 32 to 34C and lows 20 to 22C. |
| 08-11 | Wednesday | 20 | 32 | 3.41 | A few thunderstorms possible. Highs 31 to 33C and lows 19 to 21C. |
| 08-12 | Thursday | 19 | 31 | 0 | Plenty of sun. Highs 30 to 32C and lows 18 to 20C. |
| 08-13 | Friday | 18 | 31 | 0 | Mostly sunny. Highs 30 to 32C and lows 17 to 19C. |
| 08-14 | Saturday | 17 | 30 | 0 | Partly cloudy. Highs 29 to 31C and lows 16 to 18C. |
| 08-15 | Sunday | 16 | 28 | 0 | More sun than clouds. Highs 27 to 29C and lows 15 to 17C. |
| 08-16 | Monday | 16 | 28 | 0 | Mix of sun and clouds. Highs 27 to 29C and lows 15 to 17C. |
| 08-17 | Tuesday | 17 | 29 | 0.5 | More sun than clouds. Highs 28 to 30C and lows 16 to 18C. |
| 08-18 | Wednesday | 17 | 29 | 0 | Times of sun and clouds. Highs 28 to 30C and lows 16 to 18C. |
| 08-19 | Thursday | 17 | 29 | 0.65 | A few clouds. Highs 28 to 30C and lows 16 to 18C. |

FIG. 10

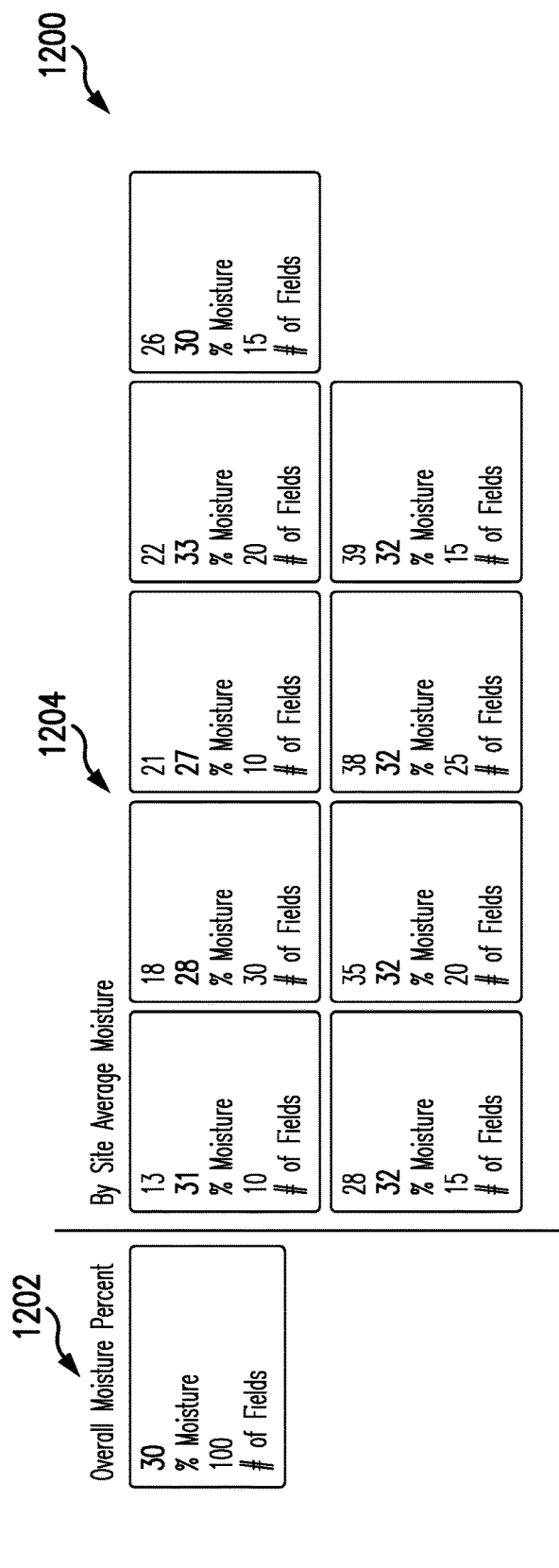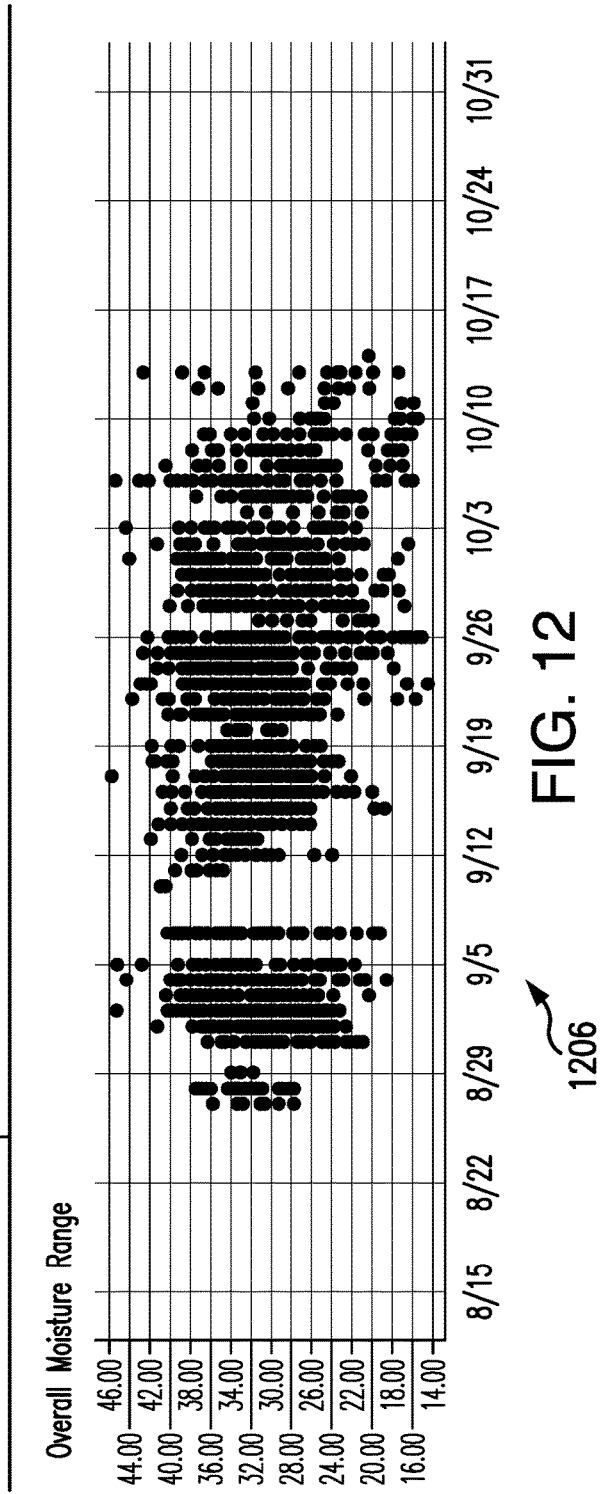
FIG. 12

Moisture Ranges by Harvested Female Ac — 1302

| Range | Value | Label |
|---|---|---|
| 14.00≤X<16.00 | 50 | Sum(Actual Harvested Ac) |
| 16.00≤X<18.00 | 200 | Sum(Actual Harvested Ac) |
| 18.00≤X<20.00 | 200 | Sum(Actual Harvested Ac) |
| 20.00≤X<22.00 | 300 | Sum(Actual Harvested Ac) |
| 22.00≤X<24.00 | 600 | Sum(Actual Harvested Ac) |
| 24.00≤X<26.00 | 900 | Sum(Actual Harvested Ac) |
| 26.00≤X<28.00 | 1,000 | Sum(Actual Harvested Ac) |
| 28.00≤X<30.00 | 1,500 | Sum(Actual Harvested Ac) |
| 30.00≤X<32.00 | 2,000 | Sum(Actual Harvested Ac) |
| 32.00≤X<34.00 | 2,000 | Sum(Actual Harvested Ac) |
| 34.00≤X<36.00 | 1,500 | Sum(Actual Harvested Ac) |
| 36.00≤X<38.00 | 1,000 | Sum(Actual Harvested Ac) |
| 38.00≤X<40.00 | 700 | Sum(Actual Harvested Ac) |
| 40.00≤X<42.00 | 2,000 | Sum(Actual Harvested Ac) |
| 42.00≤X<44.00 | 100 | Sum(Actual Harvested Ac) |
| 44.00≤X<46.00 | 10 | Sum(Actual Harvested Ac) |
| (Empty) | 0 | Sum(Actual Harvested Ac) |

Moisture Ranges by Total Harvested S8U — 1304

| Range | Value | Label |
|---|---|---|
| 14.00≤X<16.00 | 3,000 | Converted BU |
| 16.00≤X<18.00 | 20,000 | Converted BU |
| 18.00≤X<20.00 | 25,000 | Converted BU |
| 20.00≤X<22.00 | 30,000 | Converted BU |
| 22.00≤X<24.00 | 50,000 | Converted BU |
| 24.00≤X<26.00 | 90,000 | Converted BU |
| 26.00≤X<28.00 | 100,000 | Converted BU |
| 28.00≤X<30.00 | 100,000 | Converted BU |
| 30.00≤X<32.00 | 150,000 | Converted BU |
| 32.00≤X<34.00 | 200,000 | Converted BU |
| 34.00≤X<36.00 | 100,000 | Converted BU |
| 36.00≤X<38.00 | 100,000 | Converted BU |
| 38.00≤X<40.00 | 600 | Converted BU |
| 40.00≤X<42.00 | 100 | Converted BU |
| 42.00≤X<44.00 | 50 | Converted BU |
| 44.00≤X<46.00 | 10 | Converted BU |
| (Empty) | (Empty) | Converted BU |

Actual to Target (by Field)

| Plant&Field | plantnumber | fieldid | acronym | Actual Harvested Ac | targetyieldssu | SBU per Ac | Actual:Target |
|---|---|---|---|---|---|---|---|
| A1061061 | A1 | 061 | B10 | 61.40 | 85.0 | 39.47 | 46% |
| A1061062 | A1 | 062 | B10 | 46.60 | 85.0 | 24.63 | 29% |
| A1061063 | A1 | 063 | B10 | 88.70 | 85.0 | 61.31 | 72% |
| A1061064 | A1 | 064 | B11 | 59.10 | 79.0 | 101.69 | 129% |
| A1061065 | A1 | 065 | B12 | 109.50 | 87.0 | 47.34 | 54% |
| A1061079 | A1 | 079 | B14 | 45.00 | 79.0 | 110.30 | 140% |
| A1061080 | A1 | 080 | B14 | 107.20 | 79.0 | 101.47 | 128% |
| A1061033 | A1 | 133 | B20 | 75.60 | 85.0 | 65.94 | 78% |
| A1061034 | A1 | 134 | B14 | 57.30 | 79.0 | 114.17 | 145% |
| A1061036 | A1 | 136 | B21 | 54.50 | 95.0 | 97.51 | 103% |
| A1061040 | A1 | 140 | B14 | 107.80 | 79.0 | 98.28 | 124% |
| A1061043 | A1 | 143 | B14 | 43.00 | 79.0 | 91.87 | 116% |
| A1061047 | A1 | 147 | B30 | 46.00 | 97.0 | 60.34 | 62% |
| A1061049 | A1 | 149 | B40 | 101.80 | 85.0 | 68.00 | 80% |
| A1061050 | A1 | 150 | C10 | 83.30 | 100.0 | 54.50 | 55% |
| A1061051 | A1 | 151 | B12 | 58.00 | 87.0 | 85.32 | 98% |
| A1061053 | A1 | 153 | B14 | 82.60 | 79.0 | 77.86 | 99% |
| A1061175 | A1 | 175 | D10 | 102.50 | 76.0 | 59.57 | 78% |
| A1061177 | A1 | 177 | D10 | 63.20 | 76.0 | 73.41 | 97% |
| A1061178 | A1 | 178 | D10 | 113.00 | 76.0 | 72.14 | 95% |
| A1061183 | A1 | 183 | B14 | 82.90 | 79.0 | 105.82 | 134% |
| A1061189 | A1 | 189 | B14 | 77.20 | 79.0 | 80.75 | 102% |

FIG. 19

SYSTEMS AND METHODS FOR ENHANCING HARVEST YIELD

CROSS-REFERENCE TO RELATED APPLICATION

This application claims the benefit of, and priority to, U.S. Provisional Patent Application No. 63/108,259 filed Oct. 30, 2020, the entire disclosure of which is incorporated herein by reference.

FIELD

The present disclosure generally relates to systems and methods for enhancing harvest yield, and in particular, to systems and methods related to enhancing (or enhanced) harvest scheduling for multiple fields, in which factors associated with the harvest scheduling of the multiple fields are integrated and prioritized, whereby the enhanced harvest scheduling may be used in connection with enhancing harvest yield.

BACKGROUND

This section provides background information related to the present disclosure which is not necessarily prior art.

Crops are often harvested from fields according to one or more schedules, whereby pickers, either human or machine, are routed to the fields based on the schedules. In general, fields may be harvested by the pickers when the crops in the fields are ready for harvest (or are ripe). As such, the harvest schedules may include a sequential progression from one field to another field, based on locations of the fields and/or availability of the pickers. When the harvest is complete, for a field or multiple fields, the harvested crops are then transported to storage facilities, in which the crops are stored in advance of further transport for different purposes (e.g., commercial sale, crop development, crop testing, food production, etc.). In route to the storage facilities, the crops may additionally be weighed to provide measures of the amounts of crops harvested from the fields.

DRAWINGS

The drawings described herein are for illustrative purposes only of selected embodiments and not all possible implementations, and are not intended to limit the scope of the present disclosure.

FIG. 9 illustrates an example interface that may be generated by the system of FIG. 1 and/or the method of FIG. 5, to show harvest progress for a harvest plan created herein;

FIG. 10 illustrates an example weather interface that may be generated by the system of FIG. 1 and/or the method of FIG. 5;

FIGS. 12-13 illustrate example interfaces that may be generated by the system of FIG. 1 and/or the method of FIG. 5, to show moisture data for crops harvested in accordance with a harvest plan created herein;

FIGS. 18-19 illustrate example interfaces including representations of harvest totals for a given field scenario (or site) in the system of FIG. 1 and which may be generated in the method of FIG. 5.

Corresponding reference numerals indicate corresponding parts throughout the several views of the drawings.

DETAILED DESCRIPTION

Figure 1:
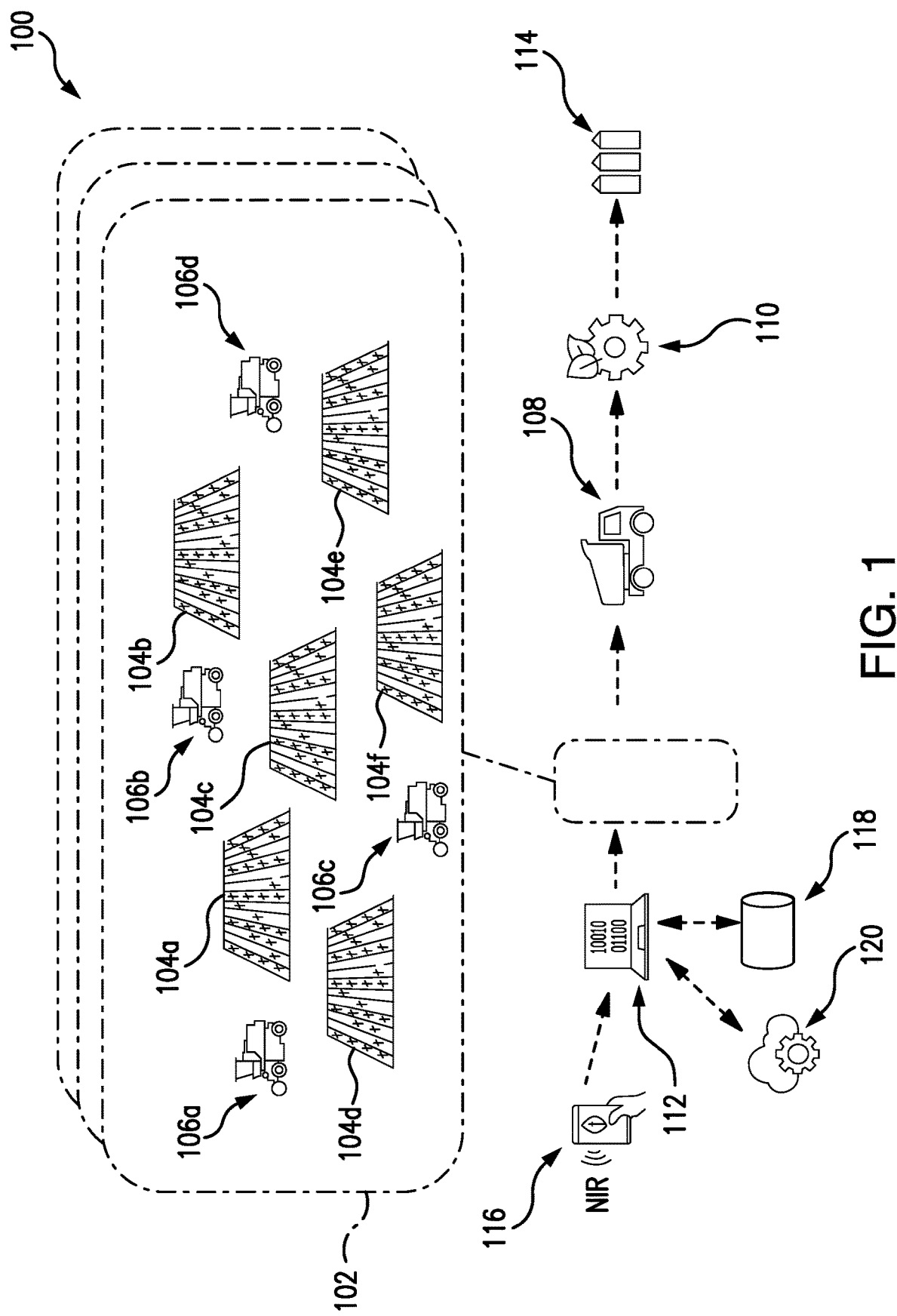
FIG. 1 illustrates an example system of the present disclosure for enhancing scheduling relating to harvesting of fields, wherein various factors associated with the harvesting of the fields are integrated and prioritized into the harvest scheduling.

Example embodiments will now be described more fully with reference to the accompanying drawings. The description and specific examples included herein are intended for purposes of illustration only and are not intended to limit the scope of the present disclosure.

When fields are harvested, crop yields from the fields are often dependent on a timing of the harvest. Under ideal conditions, where resources (e.g., pickers such as conventional ear pickers, combines, etc.) available for use in harvesting the fields are unlimited, the timing of the harvest for all of the fields may be selected to optimize the crop yields for all of the fields. In the real world, though, the resources available for harvesting the fields are limited in one way or another, whereby the harvesting of the multiple fields involves scheduling of the resources, so that certain fields are harvested earlier than other fields. As a consequence, some of the fields may be harvested before reaching desired conditions for harvest or after such conditions have been reached (potentially affecting the overall yield of the fields). In commercial environments, such scheduling may be required for tens or hundreds or even thousands of acres, or more or less, which may encompass hundreds or thousands of fields and millions of bags of seeds harvested from the fields. For instance, in one example, more than 140,000 acres may be segregated into 1,800 fields spread over a wide region, to provide twelve millions bags of hybrid seeds, of various types, qualities, etc.

Uniquely, the systems and methods herein provide for enhancing scheduling in connection with harvesting multiple fields, whereby various factors associated with the harvesting of the fields are integrated and/or prioritized into the scheduling of the harvesting operations. In particular, for a certain crop, plant or seed production operation, associated with multiple fields (e.g., and associated with multiple different plants, multiple different crops, multiple different crop varieties, multiple harvesting machines (e.g., ear pickers, combines, etc.), multiple productions sites, etc.), a platform employs one or more models (e.g., a combined parallel and series problem model, a mixed-integer-programming model, combinations thereof, etc.) to determine a yield or volume to be harvested from the different acres across the multiple fields, subject to various constraints. The constraints may relate, for example, to limitations of the harvesting machines, types of the harvesting machines (e.g., ear pickers, combines, etc.), groupings of the fields, moisture limitations, continuous harvest availability, production site limitations, particular crops (e.g., types, varieties, etc.) in the fields, etc. Then, once a yield, or maximum yield, is determined for the fields (or for the acres of the fields), the platform applies the model to perform additional iterations of the determination, through which one or more logistics associated with the harvest are altered (e.g., different fields are batched together, different acres of the same or different fields are batched together, different assignments of harvesting machines are utilized, etc.) and different crop demand satisfaction levels are applied, to identify changes in the resulting yields. In doing so, the application of the different possible logistics and/or the desired crop demands (alone or in combination) often result in changes that sacrifice the maximum yield from different ones of the acres of the fields (e.g., to achieve overall total yield, to achieve a desired value related to the yield, etc.).

With that said, the systems and methods herein are generally directed to optimizing the yield of crops across multiple fields (and/or across multiple acres) (and not necessarily to maximizing the yield of crops, although the optimized yield and the maximum yield may overlap or coincide in some implementations). As such, based on a desired final crop output (or yield combination for the multiple fields/acres) (e.g., overall (or in total) or for a particular period of time (e.g., a season, a month, etc.), etc.), a harvest schedule for the various fields is compiled by the platform, where the harvest schedule conforms to certain ones of the constraints, while providing flexibility as to the yield (e.g., to limit seed loss, etc.), the logistics, and the demand for crops planted in the fields, such that a harvester (or multiple harvesters) is/are permitted to recognize a desired or optimal application for the harvest. Consequently, by way of this unique scheduling, for a given (or comparable) yield from a production operation from season to season, less total acres may be required to achieve a desired result, thereby reducing a carbon footprint of the production operation while also reducing cost (e.g., based on less contracted acres, etc.) but still providing improved satisfaction on demand for the harvested crops.

With reference now to the drawings, FIG. 1 illustrates an example system 100 configured for use in scheduling harvesting operations for crops within one or more fields, and in which one or more aspect of the present disclosure may be implemented. Although, in the described embodiment, the system 100 includes fields and harvesting machines and other processing components, etc. presented in one arrangement, other embodiments may include the same or different features (and/or different numbers of features) arranged otherwise depending, for example, on types of crops being harvested, numbers of harvesting machines being employed, types of harvesting machines being employed, numbers of fields (and/or acres) being harvested, relationships of the fields to one another, processing of crops following harvesting operations, privacy concerns and/or restrictions, etc.

As shown in FIG. 1, the system 100 generally includes an example field scenario 102 (or also referred to as a site for field site), which includes multiple fields 104a-f and multiple pickers 106a-d (e.g., ear pickers, combine harvesters, other harvesting machines, other harvesting resources, etc.) (broadly, multiple resources). While only one field scenario is included in FIG. 1, the dotted outline of two additional field scenarios or sites is included (whereby the system 100 generally includes three field scenarios or sites) to indicate that various embodiments may include multiple field scenarios or sites. Further, each field scenario may be associated with a hub (not shown), which includes personnel and/or resources to coordinate at least the pickers associated with the given field scenario (or site) in connection with harvest.

The pickers 106a-d (broadly, harvesters or harvesting machines, etc.) (and, more generally, resources) may each include any suitable picker (or harvester or harvesting machine) based on, for example, the particular crops to be harvested in the fields 104a-f. For instance, where the crops to be harvested include corn, one or more of the pickers 106a-d may include a mechanical corn ear picker, a combine harvester, etc. Additionally, or alternatively, one or more of the pickers may include a manual picker (e.g., a person picking the corn or harvesting another crop in the fields 104a-d, etc.). That said, while pickers 106a-d are illustrated/referenced as being included in the field scenario 102 illustrated in FIG. 1, it should be appreciated that one or more field scenarios or field sites in the system 100 may include other harvesters or harvesting machines configured to collected crops from fields, etc.

The fields 104a-f in the field scenario 102 may include, for example, hundreds or thousands of fields each having multiple acres (e.g., 10 acres, 50 acres, 100 acres, 200 acres, etc.) with the same or different crops, and/or different varieties of the same crops growing therein, etc. For instance, the fields 104a-f may be populated with one or more different crops (or plants) such as (without limitation) corn (or maize), wheat, beans (e.g., soybeans, etc.), peppers, tomatoes, tobacco, eggplant, corn or maize, rice, rye, sorghum, sunflower, potatoes, cotton, sweet potato, coffee, coconut, pineapple, citrus trees, prunes, cocoa, banana, avocado, fig, guava, mango, olive, papaya, cashew, almond, sugar beets, sugarcane, oats, barley, vegetables, or other suitable crops or products or combinations thereof, etc. In addition, the fields 104a-f may each include the same type of plants/crops, or a number of different varieties of the same type of plants (or crops). For example, field 104a may include a first hybrid maize plant, while fields 104b-c may include a second, different hybrid maize plant. Fields 104d-e may then include a third, different hybrid maize plant, with field 104f including a first hybrid soybean plant, etc. It should be appreciated that the fields 104a-f may be located in proximity to one another, or not, whereby the conditions (e.g., weather conditions, harvesting conditions or times, planting seasons, etc.) of the fields 104a-f may be different from one another. As such, conditions associated with the fields 104a-f, and more specifically, the crops growing at the fields 104a-f, may be different.

What's more, each of the fields 104a-f included in the scenario 102 may, in general, represent a designated area of land that may be used for planting crops for research or production (or otherwise). In connection therewith, boundaries of the fields 104a-f may or may not be based upon fences, roads, or other topographical attributes. For example, boundaries of each of the fields 104a-f may vary in size and/or shape depending on land ownership, landscaping, or other factors (whereby each of the fields 104a-f may not be equal in size and/or shape and may have varying attributes, etc.). Further, in some example embodiments, one or more of the fields 104a-f may be defined as a plot of land that contains all of the same variety of crop, or a portion thereof.

And, a portion of the field, or plot of land, may then be harvested if it is ready, and meets certain requirements relating to such harvesting, while another portion of the field, or plot of land, may not be harvested (e.g., may not be ready to be harvested, may not be harvested for other reasons, etc.).

That said, for each of the particular fields 104a-f, for a given plant/crop, an interval is defined during which harvest of the particular crop growing in the field is preferred, in order to capture a desired yield of the particular plant/crop planted therein (e.g., an optimal yield, a maximum yield, a desired (and/or optimal yield) yield taking into account harvest of other crops and/or other fields, etc.). Harvesting at a time outside of the defined harvest interval for the given field(s) (and given plant(s)/crop(s) in the field(s)), then, tends to negatively impact the resulting yield of the field.

The defined interval for harvesting the crop(s) growing in the field(s) may be determined based various different factors (taken individually or in combination). In the illustrated embodiment, for example, the harvest interval is generally tied (at the least) to the plant/crop in the given field and to a moisture (or moisture content) of the given field (and/or of the crop(s) included in the field). As such, the harvest interval may also be referred to herein as a moisture interval (for the crop and/or field). The particular moisture content associated with the interval may then depend on the particular field, the particular crop(s) in the field, and/or the particular manner in which the crop(s) are to be harvested. For instance, for corn crops harvested via conventional pickers, the interval may be associated with a moisture content, for example, of between about 33% and about 38%, or otherwise as desired and/or based on the specific crop(s) and/or target harvest of the crop(s) (e.g., as specified by a particular moisture protocol, etc.). However, for corn crops harvested via combine harvesters, the interval may be associated with a lower moisture content of about 20% or less (see, e.g., Applicant's U.S. Patent Application Publication No. 2021/0169003, titled Combine Harvesters For Use In Harvesting Corn, And Related Methods, which is incorporated herein by reference in its entirety).

The moisture interval, as used in the illustrated embodiment, may be defined by one or more models or it may be determined empirically. For instance, in one example, the moisture interval may be defined by a growth stage model (GSM). The GSM is generally specific to a particular crop variety (as planted in the given field), and/or may vary due to inbreeding, field conditions, pathogens, etc. In this example, the GSM is designed to identify a moisture content of about 35% (e.g., a 35% moisture date, etc.) for each field (or, in some embodiments, a moisture content of about 40% (e.g., a 40% moisture date, etc.), or other percentage greater than about 40% or less than about 35%, etc.), or potentially a range of moisture contents (e.g., a range of about 33% to about 38% (e.g., for ear corn, etc.), etc.). In connection therewith, the GSM may be used to estimate the moisture content of the given field at a given time, for example, based on a duration of the given time from planting of the crops in the field, etc. (e.g., taking into account dry down, application of salt spray, etc.). That said, some crops (e.g., sweet corn, etc.) may have a relatively higher moisture content than that specified above (e.g., about 50%, etc.). For such crops, then, an alternative model (e.g., an alternative GSM specific to such crops, a model based on a number of days after pollination, etc.) may be utilized to predict harvest readiness, where empirical data is not known or immediately available (e.g., instead of or in addition to moisture content, etc.).

Alternatively, the moisture content of a field may be directly measured at the field, for example, by a moisture meter 116 (e.g., a near-infrared (NIR) instrument, etc.), etc. As an example, the moisture meter 116 may include a portable device (e.g., as available from Perten Instruments, as described in WO 2018/236787 (which is incorporated herein by reference in its entirety), etc.) and may be used to obtain multiple measurements from at least three different locations in the field (e.g., at least about 24 measurements at each location, etc.). Then, in this example, when at least about 90% of the measurements at each location indicate that the crop(s) in the field have the desired moisture content (e.g., between about 33% and about 38% for corn for conventional picker harvesting, less than about 20% for corn for combine harvesting, etc.) the field may be designated to be harvested (subject to any rules, as described below). If the desired moisture content is not satisfied, the crop(s) are allowed to further dry and subsequent testing operations may be performed until at least about 90% of the measurements indicate that the crop(s) in the field have the desired moisture content readings. With that said, it should be appreciated that the moisture content, as actually measured from one or more fields, when available, may be preferred herein and/or may override an estimated moisture content for the one or more fields.

In addition, certain hybrids of plants that are known to be suitable for or receptive of salt spray (e.g., Defol®, etc.) for dry down may be selected (or prequalified) for harvesting, to allow for increasing dry down rates of the plants in the field (e.g., to help achieve particular moisture contents sooner than naturally waiting, etc.) and help expedite harvesting of the crops (e.g., to help stay ahead of frost risks in some regions, etc.). Such application of salt spray may be accounted for in the GSM used (e.g., as a flag, etc.) in determining the interval for harvesting the given crop.

That said, it should be appreciated that the interval for harvesting crops may be tied to other factors and/or conditions associated with the given field and/or crop(s) in the field, in order to determine crop readiness for harvest. For example, the harvest interval may be tied to fluorescence characteristics, aroma, content analysis, etc. of the field and/or crop(s). Further, in some examples, the harvest interval may also be tied to dryer settings at processing or production sites available to process the harvested crops (e.g., for drying harvested crops such as ear corn, etc.).

Figure 2:
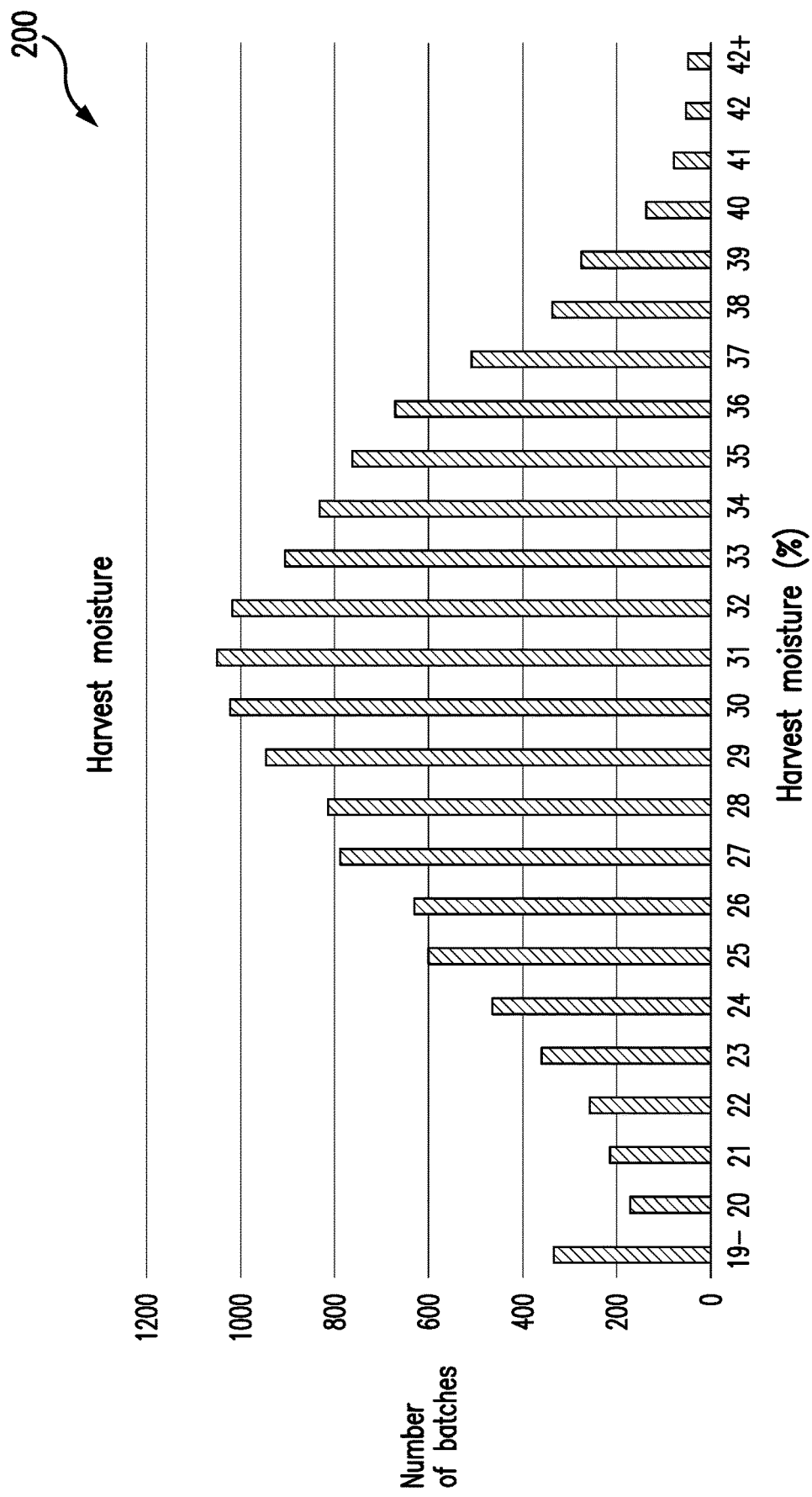
FIGS. 2-3 illustrate example moisture curves that may be utilized in the system of FIG. 1, for enhancing scheduling relating to harvesting of fields.
Figure 3:
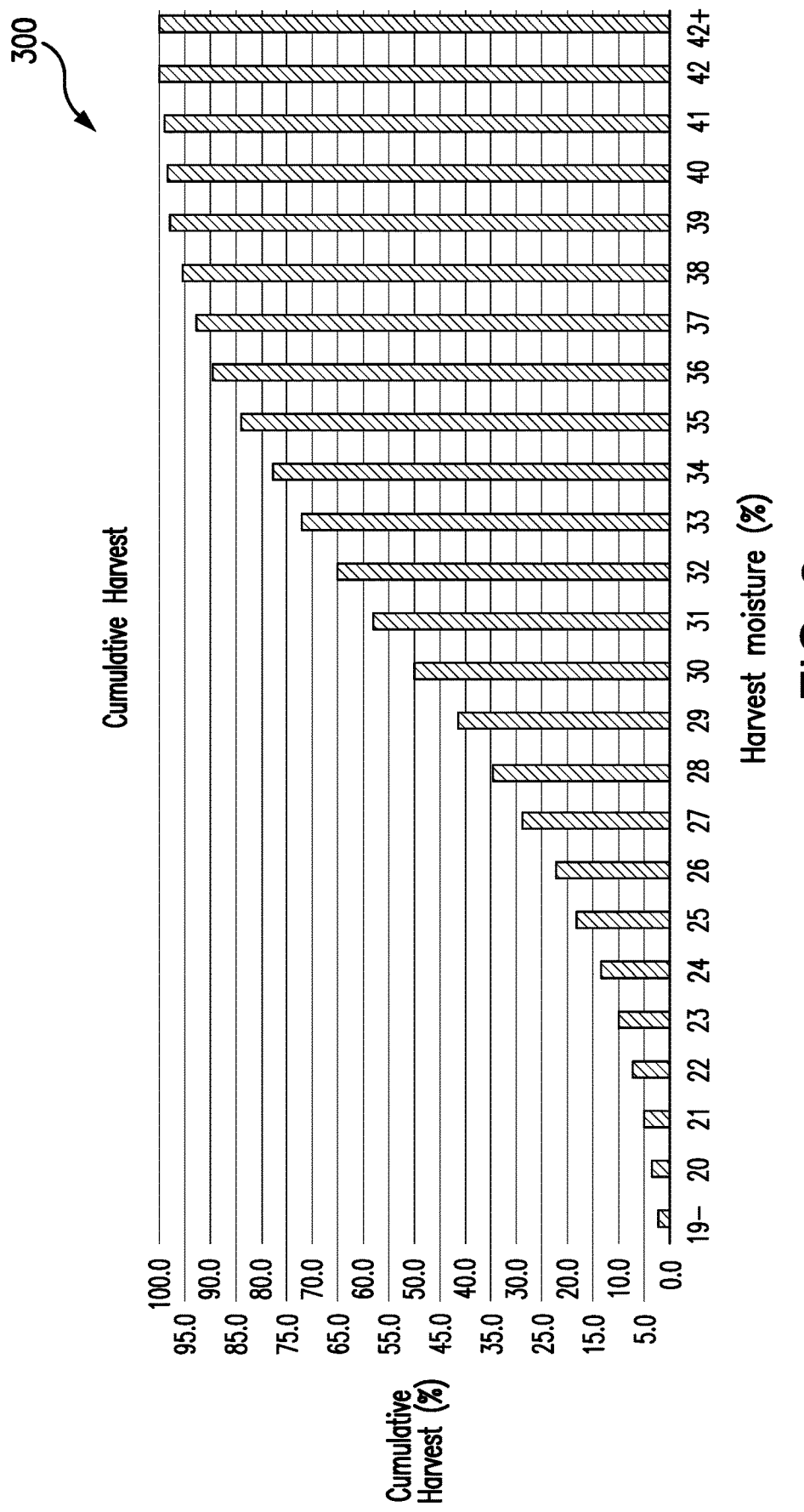

Beyond the above, moisture-yield curves may also (or alternatively) be compiled and employed, for one or more of the fields 104a-f, to define or estimate a percentage of a yield target for a given field (along the y-axis) for harvesting at a given moisture value (along the x-axis). FIGS. 2-3 illustrate example moisture yield curves 200, 300 (e.g., for corn, etc.). The yield curves 200, 300 may be the product of historical data, whereby the yield curves define an estimated yield for the crop when harvested at about 31% moisture, for example, versus about 38% moisture and the same for intermediate percentages as well as high and lower percentages (e.g., between about 20% and about 40%, for corn, etc.) In connection therewith, the moisture-yield curves 200, 300 therefore provide an estimated yield (e.g., in batches of crop, as a percentage, etc.) for a given field (e.g., based on the crop planted in the field, etc.), and the moisture at which the field is to be harvested. As such, the moisture-yield curves 200, 300 may be employed by a platform 112 of the system 100, for example (e.g., together with the determined harvest interval for the field, etc.), to quantify an estimated loss of yield for a given field due to harvesting the field outside of the moisture (or harvest) interval, or at one moisture versus another. As indicated above, moisture-yield curves (e.g., yield curves 200, 300, etc.) may be generated based on empirical, historical data for the given field or for all of the fields 104a-f in the field scenario 102 (and/or for a given crop or for all of the crops in the field scenario 102). In connection therewith, a single moisture-yield curve may be used for a given region in some examples, or multiple moisture-yield curves may be used. Further, in some examples, different moisture-yield curves may be used for different crops, for different hybrids, etc.

Each of the fields 104a-f of the field scenario 102 also exhibits a number of other characteristics, in addition to moisture content, which may be measured by machine or human intervention, or estimated, and reported to the platform 112 (for use herein). For example, screening for hybrids in each of the fields 104a-f may be performed manually by personnel at the fields 104a-f (or by aerial drones, satellites, etc.) and reported, by the personnel/drones/satellites, to the platform 112. Screening or inspection of the crops in each of the fields 104a-f may also be performed (manually, by drone, by satellite, etc.) with regard to presence of disease, crop maturity, confirmation of variety, stand evaluation, etc. Further, the screening or inspection may relate to other characteristics of the fields 104a-f, such as (without limitation) a quality of the crops growing in the field, a location of the field, a growing season for the field, a soil type (or characteristic) for the field, ear height for corn crops in the field, weed presence in the field, water ponding in the field, etc. That said, such screening or inspection, in general, may help improve supply data from the fields for the crop(s) and impact the model below.

As an example, in certain instances, combine harvesters (as an example of a picker herein) may be used to harvest fields of corn (as described in Applicant's U.S. Patent Application Publication No. 2021/0169003, titled Combine Harvesters For Use In Harvesting Corn, And Related Methods). However, in such instances, the crops in the fields (e.g., corn, etc.) may be required to dry down to lower moisture contents than if harvested using conventional corn pickers (as generally described above). As such, various different characteristics of the corn (and the fields in which the corn is planted) may be taken into account in making the harvest determinations. For instance, parent seed germination scores may be taken into account when assigning batches of corn to be harvested by the combine harvesters. Parent seed batches with poor cold germs (e.g., less than about 80%, etc.) could have issues being planted into cooler soil. Parent batch purity may also be used in placing batches of corn for such harvest (e.g., highest purity batches of corn may be selected for harvest by combines while others may be selected for conventional harvesting by pickers, etc.). In addition in this example, during the growing season (or before or after), the fields of corn may be screened or inspected for any off types and activities may be scheduled to remove such off types (prior to cutting, etc.). Further, in determining which fields to harvest, seed set, pollination ratings, and disease/insect pressure may all be considered for each particular field. A poor seed set, for instance, that contains a high amount of large rounds, may not be optimal for combine harvesting (as the seed could be damaged in the combine, resulting in poor germs). Similarly, if there are any major quality issues with the field during pollination, the field may not be selected for combine harvesting. Alternatively, if disease or insect pressure is heavy on particular fields, leaving the crop(s) in the field for longer times may result in greater damage, whereby such fields may be harvested sooner (at higher moisture contents) with a conventional picker to avoid further damage/loss.

Apart from the characteristics of the fields 104a-f (and/or crops in the fields), it should be appreciated that in one or more embodiments, ones of the fields may be grouped together (into field groups) based on, for example, a type of crop/plant growing in the fields (e.g., a same hybrid, etc.), a quality of crop/plant growing in the fields, a location of the fields (e.g., certain adjacent fields may be grouped together, etc.), etc. Fields within the same group(s), then, are assigned a common (or same) batch identifier (or group identifier). By designating ones of the fields 104a-f together in a group, the ones of the fields included in the group are designated to be harvested together or at the same time (e.g., treated like a single field, etc.) to promote efficiencies herein (e.g., logistical efficiency, change-over efficiency, bulk-storage efficiency, etc.).

In connection therewith, then, each of the pickers 106a-d in the system 100 is disposed in one of the fields 104a-f, and is configured to harvest plants/crops from the given field as the respective picker moves across the field (and over the crop). In addition, each of the pickers 106a-d is able to move between various ones of the fields 104a-f as needed (e.g., directly by operation of the given picker, via another transport device (e.g., a trailer, etc.), etc.). In the illustrated embodiment, the pickers 106a-d include conventional common pickers, such as, for example, corn harvesters. As such, the picker 106a, for example, is configured to cut corn stalks and strip the corn from the stalks. The picker 106a is then configured to advance the harvested corn into a bin (e.g., pulled behind the picker, driven next to the picker, etc.) and which may define (or may be transferred to a truck 108 (broadly, a resource) to define) a truckload of corn from the particular one of the fields 104a-f that is being harvested. It should be appreciated that the pickers 106a-d utilized in the field scenario 102 will often be specific to harvesting a particular type of plant/crop included in the fields 104a-f, or more than one type of plant/crop, but not configured to harvest other types of the plants/crops. Other harvesters or harvesting machinery, then, may be provided to harvest the other types of plants/crops.

In addition, the pickers 106a-d are each associated with operational data. The operational data may include, for example, a speed of the picker for harvesting the specific crop, rate of harvesting the crop in the given field 104a (for example), etc., whereby an estimate of a harvest time for the particular field 104a (having a specific size and crop), for example, may be determined, etc. The operational data may further include other characteristics of the pickers 106a-d, which may impact the ability of the picker to harvest a given field in a given time (e.g., a model of the picker, a number of rows the picker can harvest in one pass (e.g., a number of harvest heads associated with the picker, etc.), a number of hours a picker can operate at one time, etc.).

With continued reference to FIG. 1, the illustrated system 100 includes the truck 108 configured to receive harvested crops from one or more of the pickers 106a-d in the fields 104a-f (e.g., as the truckload, etc.). The truck 108 is configured to move the harvested crops from the respective one(s) of the fields 104a-f to a production site 110 (broadly, a resource). In this example embodiment, the production site 110 includes a number of shellers and a number of dryers (not shown), which are configured to process and dry the crops (e.g., remove corn kernels from ears of corn and dry the kernels, etc.) harvested from the one(s) of the fields 104a-f (broadly, resources). The production site 110 may include other components (or resources) to perform other operations in other embodiments (e.g., for processing other types of crops, etc.) depending, for example, on the types of crops harvested from the fields 104*a-d*, etc. And, like the pickers 106*a-d*, the production site 110 is associated with operational data. The operational data of the production site 110, like above, impacts estimated throughput of harvested crops through the production site 110. That said, the operational data of the production site 110 may relate to, for example, a number of shellers, a number of dryers, drying capabilities of the dryers, etc. The production site 110 is configured to report the process data, relating to processing of crops, to the platform 112, which is coupled in communication with the production site 110 (e.g., via one or more networks, etc.).

The system 100 further includes a storage facility 114 (broadly, a resource) for holding the harvested crops from the fields 104*a-f*. In connection therewith, the truck 108, or a different truck, is configured to convey the harvested crop from the production site 110 to the storage facility 114. The storage facility 114 is structured to store the harvested crop for a period of time. That said, the storage facility 114 may include, for example, one or more barns, silos, etc., depending on, potentially, the type of the harvested crops, the duration of required storage, etc.

In the example embodiment of FIG. 1, the system 100 also includes a decision service 120, which is configured to generate potential allocations of resources (e.g., pickers 106*a-d*, etc.) to fields 104*a-f*, at one or more times, consistent with one or more imposed constraints. The decision service 120 may include, for example, the CPLEX® service by IBM Company, etc., which is provided to solve the multi-dimensional allocations discussed herein. In this embodiment, for example, the technical harvest plan problem is expressed as a mathematical optimization model, in which a mixed integer programming model includes an objective function and set of constraints which are represented as linear inequalities. The decision service 120 is configured to then input the mathematical constructs (as described herein, and including as summarized in the tables below) and to solve for the inequalities to thereby identify one or more suitable and/or optimal harvest solutions. That said, it should be appreciated that the decision service 120 may include one or more other services and/or optimization solvers in other embodiments, including, for example, FICO® Optimization Modeler by Fair Isaac Corporation; Gurobi Optimizer by Gurobi Optimization, LLC; SAS/OR® optimization software by SAS Institution Inc.; etc.

To accommodate all of the different operations in the system 100, required to harvest the crops in the fields 104*a-f* and convey the harvested crops to the storage facility 114, scheduling is required to coordinate among (and is generally based on) the available resources (e.g., among the pickers 106*a-d*, the truck 108, the production site 110, and the storage facility 114, etc.). The scheduling is also subject to various additional factors including, for example, the moisture content of the fields 104*a-f* (and/or the crops in the fields) (as generally described above), as well as a demand for a specific one (or more) of the crops in the fields 104*a-f* and a product priority associated with the crops. The crop demand, for example, may include levels of demand for a given crop/plant, such as, for example, a high level, mid-high level, mid-level, or low-level demand, etc. (each representative by a numerical value (e.g., 1, 2, 3, 4, etc.)), etc. And, the crop priority may indicate that certain ones of the crops/plants are more important than other crops/plants (e.g., crops representing a source of food may have a priority over crops used for research, increased demand for commercial hybrids, increased demand for export hybrids, demand for refuge hybrids, a corn crop that achieves a desired moisture content to be harvested by a combine, etc.).

In connection therewith, the platform 112 of the illustrated system 100 is configured to generate the scheduling for the harvesting of the fields 104*a-f* by the pickers 106*a-d*. In the illustrated embodiment, the platform 112 includes a computing device that may be a standalone computing device, an integrated computing device, or a cloud-based computing device, etc. The platform 112 includes executable instructions (e.g., stored in a memory of the computing device, etc.), which when executed by the platform 112, configure (or otherwise cause) the platform 112 to perform as described herein with regard to generating the scheduling. The platform 112 is also associated with a data structure 118, which may be separate from the platform 112 and/or integrated, partially or wholly (as indicated by the dotted line), in the platform 112. The data structure 118 is configured to store (and thus includes) data as described herein (e.g., the data described above, etc.) (e.g., pertaining to the fields 104*a-f*, the pickers 106*a-d*, the truck 108, the production site 110, and the storage facility 114, etc.), for use by the platform 112 in generating the scheduling.

In operation to generate the field scheduling, the platform 112 is configured to retrieve the desired data relating to the scheduling from the data structure 118. This includes (without limitation) data relating to the characteristics of the fields 104*a-f* (e.g., moisture content of the fields and/or the crops in the fields, hybrids growing in the fields, etc.), groupings of the fields 104*a-f*, operational data of the pickers 106*a-d*, and operational data of the production site 110. The platform 112 is also configured to account for a current supply of the crops in the planting scenario 102 (which includes carry over crops, harvested fields, and harvested crops/plants from other fields), as well as the moisture (or harvest) interval for the crops in the fields 104*a-f*, demand levels and/or priorities for the crops, available capacities of the pickers 106*a-d* and/or dryers of the production site 110, and/or percentage(s) of dryers used by the currently harvested crops (e.g., as stored/included in the data structure 118, etc.).

In addition, as part of the scheduling, the platform 112 is configured to apply one or more rules associated with the resources in the system 100, e.g., the pickers 106*a-d*, the fields 104*a-f*, the truck 108, and/or the production site 110. The rules may relate to realistic boundaries, limitations, etc. on the use, operation, availability, etc. of the resources as they relate, for example, to the assignment of pickers 106*a-d* to the fields 104*a-f*, etc.

For instance, one example rule may define a limit on the number of pickers that can be assigned to a single field (e.g., no more than three, four, etc. pickers per field; etc.), while another example rule may define a limit on the number of fields a given picker can harvest on a given day (or a limit on which particular fields a given picker can harvest based on location data associated with the field and/or picker). A further example rule may limit allocation of only one picker to a field that can be harvested in a single day (e.g., when a field workload is less than a predefined number, such as, for example, two hours, four hours, etc.; etc.), and another example rule may specify that a field already harvested will not be scheduled (or rescheduled) for further harvest. Still another example rule may require a crop to be transported to the production site 110 on the same day it is harvested from a field, while another example rule may define a limit as to the number of pickers and/or particular ones of the pickers allocated for harvesting a field based on the field's harvesting capacity.

Another example rule may specify that a picker can be scheduled for only twelve hours per day, while a further example rule may specify that a dryer can be scheduled for only fourteen hours per day (and/or that a dryer can be scheduled for only a particular capacity (e.g., for only a particular number of bushels per interval, etc.)). Still another example rule may specify that a particular crop variety can be harvested; or that a particular crop can be harvested by a particular picker (e.g., a corn crop can be harvested by a combine harvester, etc.) upon achieving a particular moisture content or upon being identified as a particular hybrid, etc.; etc. A further example rule may require continuous harvesting by a picker such that, once harvesting operation starts for a field, the picker remains allocated to the field until the harvest is complete (with no off days in the duration of harvesting the field), while a related example rule may require continuous drying by a dryer of the production site 110 until the drying operation of a crop is complete (again, with no off days in the duration of drying the crop).

Some rules utilized/applied by the platform 112 may relate to whether or not resources are currently available to harvest a field and/or process harvested crops. For example, if no resources are available to harvest a field or dry a crop harvested from the field, an example rule may instruct the field be allocated to either a "fake" or "dummy" picker or a "fake" or "dummy" dryer, whereby the harvest date (and dry date) of a field is always the first possible day of harvest for the field. Or, another example rule may instruct, for both harvesting and drying activities, the field be assigned to a "fake" picker and a "fake" dryer (e.g., in combination, etc.) if resources are not available for either harvesting the field or drying the harvested crop form the field. In either case, if a field is assigned a "fake" resource (e.g., a picker, a dryer, etc.), the resource can only be assigned on the first possible day of harvest or drying. However, the first possible day of harvest is not necessarily the 40% moisture date; it may be any day after depending on the run date. That said, such rules relating to use of "fake" resources may help inhibit the platform 112 from failing at runtime due to a lack of capacity or other reason.

Still other rules may relate specifically to characteristics of the fields, such as moisture content (e.g., a rule may specify that a field can only be harvested once the field achieves a 40% moisture date, but not prior; etc.), quality of crops in the fields, locations of the fields, etc. In addition, one or more of the rules utilized by the platform 112 may be adjusted year to year or harvest to harvest depending on various factors, etc. It should be appreciated that other rules may be applied, by the platform 112, which may impact how pickers are scheduled for the fields. It should also be appreciated that the rules described herein, defining limits or controls of the schedule of the harvest, in the context of the model described herein, are generally expressed as constraint algorithms in the tables provided below.

Further rules may apply to the particular fashion in which crops are to be harvested (e.g., use of a conventional ear picker to harvest corn versus a combine harvester, etc.). For instance, for use of a combine harvester to harvest a crop of corn, some rules may relate to a specific window for harvesting the corn in which moisture content of the corn is between about 12% and about 18%; some rules may relate to available dryer bin capacity to process the harvested corn; some rules may relate to seed loss for harvesting corn at moisture contents of between about 12% and about 18%; etc. What's more, it should be appreciated that application of some rules with regard to one particular fashion of harvesting crops may affect rules relating to another fashion of harvesting. For instance, a field may be designated for harvesting by a combine harvester at a moisture content of between about 12% and about 18%. In doing so, rules relating to harvesting corn by a conventional ear picker may no longer apply the field.

The platform 112 is further configured to receive data inputs from one or more users (e.g., growers associated with one or more of the fields 104a-f, other users, etc.) or from other computing devices, in connection with scheduling the pickers 106a-d for harvesting the fields 104a-f. The data inputs may include, without limitation, current locations of the pickers 106a-d, the desired moisture interval (e.g., by date, by field, by crop, etc.), a planned volume of harvested crops, a total acres of the fields 104a-f being harvested, a planned and estimated yield for the fields 104a-f, a planned and estimated carry-in inventory from the prior year (e.g., seed inventory still available for use, seed returned by a farmer, etc.), to-date bushels harvested and dates of harvest, product priority indications, product demand indications, screening data, input harvest from third parties, fields to be harvested in a next interval (e.g., a next week, etc.), etc. Additional data inputs may relate to weight of harvested crops (e.g., provided from the pickers 106a-f (via weight calculators/devices provided onboard the pickers), provided from the trucks 108 (e.g., onboard, etc.), provided at weigh stations/locations, provided at storage facilities for the harvested crops, etc.).

Then, based on the above data, rules, and inputs, etc., the platform 112 is configured (by way of the executable instructions) to employ, for example, a model (or algorithm or multiple algorithms) to schedule the pickers 106a-d to harvest the fields 104a-f. In doing so, the platform 112 is configured to effectively assign one or more of the pickers 106a-d to one or more of the fields 104a-f in the field scenario 102, for example, at suitable times to harvest the fields 104a-f. The platform 112 is also configured to account for transporting the harvested crops to the production site 110 and storage facility 114.

That said, Table 1 includes example decision variables that may be accounted for in a model (individually or in two or more combinations) employed by the platform 112 to schedule the pickers 106a-d to harvest the fields 104a-f.

TABLE 1

| Decision Variable | Type | Description |
|---|---|---|
| realVolDiffPos$_{hs}$ | Continuous | Difference between harvested volume of hybrid h with demand level s |
| harvest$_{pft}$ | Binary | 1 if picker p is allocated to harvest field f at time t; else 0 |
| harvestFraction$_{pft}$ | Continuous | Fraction of time picker p harvests field f at time t |
| pickerUsed$_{fp}$ | Binary | 1 if picker p is used for harvesting field f |
| harvestField$_{ft}$ | Binary | 1 if field f is harvested on time t |
| lastDayOfHarvest$_{ft}$ | Binary | 1 if day t is the last day a picker is harvesting field f |
| hybHarvest$_{sht}$ | Binary | 1 if hybrid h is harvested on day t at field site s |
| SAPBatchStart$_b$ | Continuous | Harvest start date of batch b |
| SAPBatcDuration$_b$ | Continuous | Harvest duration of all fields within batch b |
| MPBin$_f$ | Binary | 1 if field is harvested earlier than recommended moisture date (based on given moisture protocol (MP)) |
| hybharvest$_{sht}$ | Binary | 1 if hybrid h is harvested in field site s, and day t |

Table 2 illustrates example data inputs that may be utilized in and/or accounted for in the model (individually or in two or more combinations) employed by the platform 112 to schedule the pickers 106a-d to harvest the fields 104a-f.

TABLE 2

| Variable | Description |
| --- | --- |
| hybrids | All hybrids that are planted in commercial fields |
| supply$_h$ | Total supply available for a hybrid including carry over, harvested fields in the current year, and toller grown products |
| suppPriority | Priority levels for products |
| batches | All SAP bulk batches |
| BatchDate$_b$ | Last harvest date of a partially harvested batch |
| field$_{sb}$ | All fields belonging to batch b |
| fieldsSameHybrid$_{sh}$ | All fields with hybrid h at field site s |
| fields | List of all commercial fields in US for the current year CY |
| drierFields$_d$ | Set of all fields a drier is allowed to dry |
| timePeriods | All time periods where harvest and drying can be scheduled |
| dryers | List of all dryers at production site |
| dryer$_f$ | Dryer of the production site which field f belongs |
| Pickers | List of all pickers |
| demandLevels | All demand levels such as shipment forecast, safety stock, total supply, etc. |
| demand$_{lh}$ | Demand level l for product h |
| plannedVol$_f$ | Planned volume of field f |
| yield$_f$ | Yield of field f |
| busshlesPerDay$_d$ | Bushel's per day capacity of drier d |
| firstDay$_f$ | First day field can be harvested. |
| lastDay$_f$ | The last day field f can be harvested based on allowable moisture window |
| harvestTime$_f$ | All the feasible times a field can be harvested |
| pickers$_f$ | All the pickers that can be used for harvesting a field |
| drierTimes$_f$ | All the feasible times a field can be dried at the production site drier |
| drierUsage$_{dt}$ | Usage of drier d on day t |
| drier$_f$ | All the driers that can be used for drying a field |
| site$_f$ | Site of field f |
| harvestCap$_s$ | Daily harvest capacity of field site s |
| pickerSpeed | Number of acres harvested per hour |
| dailyHarvestHrs | Number of hours available on daily basis for harvest |
| harvestedFields | Set of fields that are already harvested |
| acres$_f$ | Number of acres within a field for harvest |
| fields$_{pt}$ | Set of fields that can be harvested by picker p at time t |
| maxFieldPickers | Maximum number of pickers per field for harvest |
| percentHarvested$_f$ | Percentage of field harvested |
| futureDays$_t$ | Set of time periods greater than day t |
| drierDailyHours | Number of operating hours for driers per day |
| drierAvgTime$_s$ | Average drying time of field at field site s in hours |
| dryingTimes$_f$ | Set of all days field f can be dried |
| nonDryingTimes$_{dt}$ | Days drying is not allowed for given field in field site d if harvest is completed on day t |
| pushDays$_f$ | Number of days field f allowed to be harvested earlier than recommended moisture protocol |
| MP$_f$ | Harvest moisture recommended by protocol for field f |
| dryerFrac$_{ft'}$ | Fraction of dryer used on day t if field f is harvested on day t' (based on yield, moisture, yield loss, dryer average time, and daily picker and dryer hours) |
| yieldMoisture$_{ft}$ | Percentage of in-season yield obtainable if field f is harvested on day t (if field is harvested at ideal moisture window, the value is 1, else it will be less than one depending on the moisture) |
| changeOver$_s$ | Maximum number of daily change overs at field site s |

Tables 3-7 illustrate example constraints (or constraint expressions) that may be utilized in and/or accounted for in the model (individually or in two or more combinations) employed by the platform 112 to schedule the pickers 106a-d to harvest the fields 104a-f.

The constraints may be based on one or more of the rules described above, or they may be based on one or more other rules. More particularly, Table 3 illustrates example constraints (and descriptions thereof) relating to multi-staging (or multi-stage modeling), Table 4 illustrates example constraints (and descriptions thereof) relating to bulk batching, Table 5 illustrates an example constraint relating to moisture content, Table 6 illustrates example constraints (and descriptions thereof) relating to harvest and field operations, and Table 7 illustrates example constraints (and descriptions thereof) relating to production site resources (e.g., dryers, etc.).

TABLE 3 fakeCnstr: minFakeObj ≤ 100000000
Volume produced by fake pickers and driers is initially assumed to be almost unlimited; once stage where fake volume is minimized, the upper bound of this constraint is updated by the objective function of the model.

TABLE 3-continued totalvolCnstr: totalVol ≥ 0

Allows total real volume to initially be greater than zero; once fake volume is minimized, the lower bound of this constraint is updated by the objective function of the model.

$$P_i L_s: \sum_{\substack{h \in hybrids \\ rank[h]=i}} realVolDiffPos_{hs} \geq 0 \ \forall \ i \in suppPriority, s \in demandLevels$$

$$\sum_{\forall b \in batches} SAPBatchDuration_b \geq 0$$

Right-hand side is limited by an upper bound once batch scheduling stage is solved.

maxFakeField: $\Sigma_{f \in fields} \Sigma_{t \in harvestTime_f} \Sigma_{p \in FakePicker} Harvest_{pft} \geq 0$ Right-hand side is updated to an upper bound once the maximum number of fields harvested by the dummy picker/dryer is minimized.

$$\sum_{f \in fields, pushDays_f > 0, t \in harvestTime_f, t < MP_f - pushDays_f} MPBin_f \leq |\{f \mid f \in fields;\ pushDays_f > 0\}|$$

Sets an upper bound on the number of fields that are harvested before recommendations based on moisture content. This constraint applies to fields that have flexibility of being harvested few days earlier than recommended moisture date.

$$\sum_{f \in fields, pushDays_f = 0, t \in harvestTime_f, t < MP_f - pushDays_f} MPBin_f \leq |\{f \mid f \in fields;\ pushDays_f = 0\}|$$

Sets an upper bound on the number of fields that are harvested before moisture protocol. Applies to fields that do not have flexibility of being harvested earlier than recommended moisture date.

TABLE 4

$$\sum_{t \in harvestTime_f} -lastDayOfHarvest_{ft} + SAPBatchStart_b \geq 0 \ \forall \ b \in batches, f \in fields_b$$

$$-\sum_{t \in harvestTime_{f_2}} t \times lastDayOfHarvest_{f_2 t} + \sum_{t \in harvestTime_{f_1}} t \times lastDayOfHarvest_{f_1 t} \leq$$

$$SAPBatchDuration_b\ \forall b \in batches, f_1 \in fields_b, f_2$$

Calculates a duration by which all fields within a batch are harvested. Applies to batches of fields that have not yet been harvested.

$$\sum_{t \in harvestTime_{f_2}} t \times lastDayOfHarvest_{f_2 t} - BatchDate_b \leq SAPBatchDuration_b$$

$\forall b \in batches, f_1 \in fields_b, b$ is partially harvested, $f_1$ is not harvested Applies to batches in which some fields are harvested and some are remaining. Batch duration is calculated using a latest actual harvest date of the batch and recommended harvest date of remaining fields.

TABLE 5

$$\sum_{t \in harvestTime_f, t < MP_f - pushDays_f} lastDayOfHarvest_{ft} \leq MPBin_f\ \forall\ f \in fields$$

TABLE 6

$$\Sigma_{t \in harvestTime_f} \Sigma_{p \in pickers_f} harvestFraction_{pft} \times dailyHarvestHrs \times pickerSpeed =$$

$$acres_f \times (1 - percentHarvested_f)$$

$$\forall f \in fields$$

Sufficient pickers need to be allocated to a field to harvest it completely.

TABLE 6-continued

Fp: $\Sigma_t$ Harvest$_{pft}$ = 0
$\forall$f $\in$ fields, t > firstDay$_f$, p $\in$ FakePicker
If a fake picker is used for a field, it should be used on the first day of harvest.

$$\sum_t \text{Harvest}_{pft} \leq 1 \ \forall \ f \in \text{fields}, \ \frac{\text{acres}_f}{pickerSpeed \times dailyHarvestHrs} < 0.2, \ t \in drierTimes_f, \ p \in \text{pickers}_f$$

If field workload is insignificant (e.g., less than two hours, etc.), only one picker is used and harvesting is completed in one day.
$\Sigma_{t \in harvestTime_f}$Harvest$_{pft}$ $\leq$ 2 $\times$ pickerUsed$_{fp}$
$\forall$f $\in$ fields, p $\in$ pickers$_f$
If a field is harvested by any picker on any day, then pickerUsed$_{fp}$ is set to be 1. This constraint also limits the number of days a picker can harvest a field.
$\Sigma_{f \in fields_{pt}}$harvestFraction$_{pft}$ $\leq$ 1
t $\in$ harvestTime$_f$, p $\in$ pickers$_f$, p $\neq$ Fake
Total fraction of time a picker can harvest fields on a given day is less than or equal to one.
$\Sigma_{p \in pickers_f}$pickerUsed$_{fp}$ $\leq$ maxFieldPickers
$\forall$f $\in$ fields
Limits maximum number of pickers that can harvest a field during a season.
$\Sigma_{f \in fields_{pt}}$harvest$_{pft}$ $\leq$ 5
t $\in$ timePeriods, p $\in$ pickers$_f$, p $\neq$ Fake
Limits picker to being in five fields or less on a given day.
$\Sigma_{p \in pickers_f}$harvest$_{pft}$ $\leq$ harvestField$_{ft}$ $\times$ maxFieldPickers
$\forall$f $\in$ fields, t $\in$ drierTimes$_f$
If a field is harvested on day t, then the value of harvestField is set to one.
$\Sigma_{p \in pickers_f}$harvest$_{pft}$ $\geq$ harvestField$_{ft}$
$\forall$f $\in$ fields, t $\in$ drierTimes$_f$
If harvestField is set to one, then at least one picker should harvest that field on that day.
$\Sigma_{t \in harvestTime_f}$lastDayOfHarvest$_{ft}$ = 1
$\forall$f $\in$ fields
Only one day can be the last day of the harvest for a field.
harvestFraction$_{pft}$ $\leq$ harvest$_{pft}$
$\forall$p $\in$ pickers, p $\neq$ fake, t $\in$ timePeriods, f $\in$ fields
If harvest Fraction variable greater than zero, then harvest binary variable should be one; if harvest binary variable is zero, then harvest Fraction variable must be zero.
harvestFraction$_{pft}$ $\times$ M$_1$ $\geq$ harvest$_{pft}$
$\forall$p $\in$ pickers, p $\neq$ fake, t $\in$ timePeriods, f $\in$ fields
If harvest Fraction variable is zero, then harvest binary variable must be zero; if harvest binary variable is positive, then harvest Fraction variable must be positive; minimum value of harvest Fraction value will be 1/(big value for M$_1$ to ensure constraint is properly represented).
harvestFraction$_{pft}$ $\leq$ harvest$_{pft}$
$\forall$t $\in$ timePeriods, f $\in$ fields, p = fake
harvestFraction$_{pft}$ $\times$ M$_1$ $\geq$ harvest$_{pft}$
$\forall$t $\in$ timePeriods, f $\in$ fields, p = fake
If harvest Fraction variable is zero, then harvest binary variable must be zero; if harvest binary variable is positive, then harvest Fraction variable must be positive; minimum value of harvest Fraction value will be 1/(big value for M$_1$ to ensure constraint is properly represented).
$\Sigma_{futureDays_f}$harvestField$_{ft}$ $\leq$ (1 − harvestField$_{ft}$ + harvestField$_{f(t+1)}$) $\times$ 3
$\forall$f $\in$ fields, t $\in$ timePeriods, t < lastDay$_f$
If on day t a field is harvested, but not on the next day, then harvest cannot happen on any of the future days. This constraint enforces continuous harvest operation per field.
lastDayOfHarvest$_{ft}$ = 0
$\forall$f $\in$ fields, t $\notin$ harvestTime$_f$
If picker can't work on a day, that day can't be the last day of harvest.
lastDayOfHarvest$_{ft}$ $\leq$ $\Sigma_{p \in pickers_f, p \neq fake}$harvest$_{pft}$ + harvestFraction$_{(fakePicker)ft}$
$\forall$t $\in$ timePeriods, f $\in$ fields
If a given day is the last day of harvest, at least one picker should be harvesting on that day.

$$(1 - lastDayOfHarvest_{ft}) \times 6 \geq \sum_{p \in pickers_f} \sum_{t' > t} harvestFraction_{pft} \ \forall \ t \in timePeriods, \ f \in \text{fields}$$

If last day of harvest is 1, harvest for all future days are zero
realVolDiffPos$_{hl}$ $\geq$ supply$_{lh}$ − $\Sigma_p \Sigma_f \Sigma_t$ yieldMoisture$_{ft}$ $\times$ acres$_f$ $\times$
dailyHarvestHrs $\times$ pickerSpeed $\times$ harvestFraction$_{pft}$
$\forall$h $\in$ hybrids, l $\in$ demandLevels
Calculates a shortage of supply according to carry over, currently harvested crop, and demand levels.

$$\sum_{\substack{f \in s \\ p \neq fake}} \sum_{p \in pickers_f} acres_f \times dailyHarvestHrs \times pickerSpeed \times harvestFraction_{pft} \leq$$

harvestCap$_s$, $\forall$s $\in$ sites, t $\in$ timePeriods

Harvested acres at field site on daily basis cannot exceed site's harvesting capacity.
0 $\leq$ harvestFraction$_{pft}$ $\leq$ 1
$\forall$p $\in$ pickers, t $\in$ timePeriods, f $\in$ fields

TABLE 7

$$drierCap: \sum_{f \in drierFields_d} \sum_{t' \in timePeriods} lastDayOfHarvest_{ft} \times dryerFrac_{ft'} \leq busshlesPerDay_d \; \forall t \in timePeriods, d \in dryer$$

On any given day, dryer volume required by harvested fields at field site cannot exceed production site's drying capacity.

$$sethybharvest: \sum_{f \in s} \sum_{\substack{p \in pickers_f \\ p \neq fake}} \sum_{f \in fieldsSameHybrid_{sh}} harvest_{pft} \leq bigM \times hybharvest_{sht}$$

$$\forall s \in sites, h \in hybrids, t \in timePeriods$$

If field at field site s, with hybrid h, is harvested on day t, then value of hybharbest binary variable is set to 1.

$$changeOver: \sum_{h \in hybrids} hybharvest_{sht} \leq changeOver_s \; \forall \, s \in sites, h \in hybrids, t \in timePeriods$$

Number of unique hybrids harvested on daily basis at field site cannot exceed a predefined number according to site's capacity.

In an example application of the decision variables, data inputs, and constraints of Tables 1-7 to determine a harvest scheduled for the fields 104a-f, the platform 112 is configured to determine a harvest plan for the relevant fields. In particular, the platform 112 is configured based on the above to provide a multi-stage, multi-iteration approach, which is solved sequentially, to determining the harvest plan.

At the outset, the platform 112 is configured to retrieve data from the data structure 118 related to the fields 104a-f, the pickers 106a-d, and other suitable resources, etc. In addition, the platform 112 is configured to retrieve certain constraints to limit the initial harvest plan iterations. Specifically, in this example embodiment, the platform 112 is configured to impose the above described constraints (e.g., in Tables 3-7, etc.) related to dryer capacity, pickers, supply demand, bulk batch and moisture content.

With the constraints, the platform 112 is configured to employ the decision service 120 (e.g., CPLEX® by IBM Company, etc.) to solve the multi-dimensional allocations discussed herein. In particular, the platform 112 is configured to input the above constraints, along with the fields 104a-f (and other field sites), and other data retrieved from the data structure 118, and to generate a series of potential allocations of pickers to fields based on the constraints. For example, the platform 112 may be configured to compile a matrix of the relative locations of the fields 104a-f (and the distance(s) therebetween), whereby the platform 112, via the decision service 120, relies, at least in part, on the distance to assign the pickers to the fields. It should be appreciated that in this embodiment, the platform 112 is configured to separate the fields into one or more field sites (or field scenarios), whereby the potential allocations are per site. In the system 100, the field scenario 102 may be considered one site, and the system 100 may include further additional sites (which are generally the same as the field scenario 102 (with additional or fewer fields or pickers), etc.), etc. In one example, the system 100 includes eight, nine, or ten sites or scenarios (each separated geographically) (or more or less).

As such, the decision service 120 may identify any number of potential allocations of the pickers to the fields for the field site(s). In a scenario where the field site includes hundreds of pickers and a thousand or more fields, the decision service 120 may provide millions of potential allocations (or allocation options or allocation possibilities) for which the pickers are assigned to certain fields, based on the constraints. In doing so, as indicated above, fake pickers may be included as a "slack" variable in the potential allocations, as needed, to ensure completeness and/or avoid infeasibility of the allocation.

Then, for the potential allocations for a first field site (and each other site or scenario), in this example embodiment, the platform 112 is configured to initially, in a first stage, limit (or minimize or even eliminate) the number of "fake" resources included in the potential allocation plans above. This is expressed through the following equation (1):

$$\Sigma_{f \in fields} \text{pickerUsed}_{fp="fake"} \quad (1)$$

It should be appreciated that the fake resources are included to avoid failure of the model where certain constraints cannot be satisfied by the available pickers (broadly, resources). In addition, the above is subject to improving or maximizing the following constraint (equation (2)):

$$\text{pickerUsed}_{fp="real"} + \text{pickerUsed}_{fp="fake"} = 1 \, \forall f \in \text{fields} \quad (2)$$

Based on the above, then, the potential allocations are ranked relative to one another, and a threshold is identified (e.g., through empirical analysis, etc.), whereby ones of the potential allocations are advanced from the instant stage of generating a harvest plan. For all the allocations advanced, the platform 112 is configured to determine commonality of pickers assigned to fields, and then to assign the pickers to the respective fields. That is, where the picker 106a is assigned to field 104d in the advanced allocations, the picker is assigned to that field and no longer permitted to be assigned elsewhere, for this iteration of generating the harvest plan. The limit on the number of fake pickers is then carried forward into a next stage.

The platform 112 is configured to then iterate the potential allocations by employing the decision service 120, subject to the same constraints above and with the assigned pickers as provided in the prior stage. The potential allocation here includes a harvest time assigned to the pickers in the fields for harvest of the field site. For example, the date and time of the picker being at a field is defined over a remainder of a harvest period (e.g., eight weeks from a start of harvest, or less depending on a date the harvest plan is generated; etc.).

It should be appreciated that the potential allocations in the subsequent stage(s) are often fewer than the potential allocations included in the initial stage.

Once the potential allocations are again identified, the platform 112 is configured to limit the batch range for the harvest plan, whereby the duration to harvest pre-identified batches of fields 104*a-f* is limited and/or minimized based on a number of days between the first and last field in a batch to be harvested. This stage is associated with limiting or minimizing the following objective equation (3):

$$\sum_{b \in batches} SAPBatchDuration_b \qquad (3)$$

The platform 112 is configured to then employ the above batch equation (3) to rank the potential locations relative to one another. And, the platform 112 is configured to advance ones of the allocations to a next stage based on a suitable threshold, which is determined, as about, empirically or based on historical data, etc. Where ones of the allocations satisfy the threshold, the allocations are advanced to a further stage, and commonalities among the advanced allocations (e.g., time associated with bulk batches, etc.) are again imposed on the harvest plan (and as additional constraints to the further potential allocations). Here, where field 104*d* is picked by picker 106*a* in a certain time period (as part of a batch) among all or a portion of the advanced allocations, the picker is assigned to that field in that certain time period.

Next, the platform 112 is configured to iterate the potential allocations by employing the decision service 120 (still within the field site), subject to the same constraints above and with the assigned pickers as provided in the prior stage. The potential allocation here included a harvest time, and further the harvest time relative to a specified moisture content for the specific crop in the specific field, as defined, for example, by a harvest-moisture curve (e.g., FIG. 2 or FIG. 3, etc.).

The platform 112 is configured to then limit or reduce the number of fields 104*a-f* that are scheduled to be pushed relative to a specific harvest date. This is determined separately for each of the relevant fields, for fields that can be pushed and those that cannot be pushed (given a desired moisture range). In connection therewith, the platform 112 is configured to determine, for each allocation, a number of push days, as defined by equation (4) below:

$$\sum_{f \in fields, pushDays_f > 0, t \in harvestTime_f, t < MP_f - pushDays_f} MPBin_f \qquad (4)$$

Based on the number of push days, then, the potential allocations are again ranked relative to one another, and a threshold is identified (e.g., through empirical analysis, etc.). Where ones of the allocations satisfy the threshold, the allocations are advanced, and precedence associated with ones of the fields that cannot be pushed in view of the desired moisture range are assigned into the harvest plan (and as a further constraint in a next stage). The platform 112 is configured to then iterate the potential allocations by employing the decision service 120 (still within the field site), subject to the same constraints above and with the assigned precedence of certain fields at certain times.

In connection therewith, the platform 112 is further configured to determine the expected yield, which is based on the expected moisture of the field for that day (e.g., as indicated by the moisture curve for the crop, etc.). The platform 112, in doing so, is configured according to the equation (5) below:

$$\sum_{f \in fields, pushDays_f > 0, t \in harvestTime_f, t < MP_f} pushDays_f \text{harvestFraction}_{p,f,t} * \text{pickerSpeed} * \text{dailyHarvestHrs} * \text{yieldMoisture}_{f,t} * \text{yield}_f \qquad (5)$$

As above, the platform 112 is configured to rank the potential allocations based on yield, relative to one another. The platform 112 is configured to then advance ones of the allocations to a next stage based on a suitable threshold, which is determined, as above, empirically or based on historical data, etc. Where ones of the allocations satisfy the threshold for yield, the allocations are advanced, and a lower bound for the yield for the field site is added as a constraint for the next stage. The lower bound constraint is expressed in the equation (6) below, where α is the threshold as applied above.

$$\sum_{\forall p \in pickers, t \in timePeriods, f \in fields} \text{harvestFraction}_{p,f,t} * \text{pickerSpeed} * \text{dailyHarvestHrs} * \text{yieldMoisture}_{f,t} * \text{yield}_f \geq \alpha\% \qquad (6)$$

In this example embodiment, the platform 112 is configured to combine the different field sites (or field scenarios) together, whereby the specific allocation committed for the individual stages above, for the fields, pickers, precedence, lower yield bound, etc., are combined.

Simultaneously, for all field sites, then, the platform 112 is configured to iterate the potential allocations by employing the decision service 120, subject to the same constraints above. The resulting potential allocations are indicative of harvest of all fields over the remaining harvest time. For the potential allocations, the platform 112, in this next stage, is then configured to limit estimated shortfalls between demand volume and harvest volume across all fields in every field site, as included in the harvest plan. In particular, apart from the fields, a demand exists for the content of the fields 104*a-f* (e.g., one hybrid versus another, etc.). As such, while it may be desired to maximize yield, it may also be an objective herein to sacrifice yield to ensure that a demand for a certain crop is satisfied. As such, the platform 112 is configured to determine a shortfall for each of the potential allocations, consistent with the equation (7) below:

$$\sum_{\substack{h \in hybrids \\ rank[h]=i}} realVolDiffPos_{h,s} \qquad (7)$$

Next, the platform 112 is configured to rank the potential allocations based on shortfall, or real volume differential, relative to one another. The platform 112 is configured to then advance ones of the allocations to a next stage based on a suitable threshold, which is determined, as above, empirically or based on historical data, etc. Where ones of the allocations satisfy the threshold for yield, the allocations are advanced, and product priorities based on supply and demand constraints are added, whereby certain crops are given priority over other crops, consistent with equation (8) below:

$$realVolDiffPos_{hl} \geq \qquad (8)$$
$$supply_{lh} - \sum_{p}\sum_{f}\sum_{t} yieldMoitsure_{ft} \times acres_f \times dailyHarvestHrs \times$$
$$pickerSpeed \times harvestFraction_{pft}$$
$$\forall\, h \in hydrids,\, l \in demandLevels$$

The platform 112 is configured to then iterate the potential allocations by employing the decision service 120 (still among all field sites), subject to the constraints above.

Based on the potential allocations, the platform 112 is then configured to determine a sum of start days across batches for every field site, based on equation (9):

$$\sum_{b \in batches} SAPBatchStart_b \qquad (9)$$

As above, the platform 112 is configured to rank the potential allocations based on the sum of the start days, relative to one another. The platform 112 is configured to then designate the potential allocations having the lowest number of start days across the batches, as the harvest plan for the field sites.

The harvest plan includes at least a listing of the fields and a designation of the harvest date for the fields, along with the picker(s) to harvest the fields. It should be appreciated that other data, such as, for example, moisture content, estimated moisture content, etc., may be included in the output harvest plan as well, along with other relevant or suitable data, etc. The platform 112 is then configured to store the harvest plan in a data structure, such as, for example, the data structure 118. The platform 112 further is configured, in some embodiments, to impose a visualization layer that provides, for example, various interfaces and/or reports to the end users (e.g., to growers associated with the fields 104a-f, operators of the pickers 106a-d, other users, etc.) at different levels of granularity starting from the site level, field level, dryer and picker capacity, supply and demand views.

The platform 112 may be configured to then implement the harvest plan in one or more of the fields 104a-f, in the pickers 106a-d, the truck 108 and the production site 110, etc. of the system 100. The harvest plan is generally implemented through instructions to a hub associated with different field sites, whereby personnel at the sites impose the harvest plan (for the site) on the pickers and personnel associated with the site. For instance, in accordance with the harvest plan, the platform 112 and/or hub may send directions to the pickers (e.g., directly to the pickers, to operators of the pickers (via email or other suitable communication, etc.), etc.) directing the pickers to particular fields, and the pickers then travel to the fields and harvest crops/plants from the fields. In one example, the platform 112 is configured to send the directions directly (or indirectly) to the pickers, whereby the pickers automatically respond to the directions and travel to the appropriate fields (via GPS devices at the pickers and GPS coordinates, via WIFI, or via other location mechanisms so that locations of pickers in the fields can be determined and the fields can be harvested (e.g., particular fields can be harvested, particular rows in the fields can be harvested, etc.) or whereby the directions are displayed to individuals associated with the pickers (e.g., at displays within the pickers, etc.) and the individuals then direct the pickers to the appropriate fields, etc.). The platform 112 and/or hub may also direct trucks to collect the harvested crops/plants, and to transport the crops/plants to desired production sites for processing (e.g., drying, storage, etc.), again in accordance with the harvest plan. In this way, the harvest plan is implemented, and crops/plants are harvested and processed based thereon.

Once at the appropriate fields, the pickers operate to harvest the plants/crops from the fields. For example, where the plants/crops include corn plants and where the pickers include ear pickers, the pickers may be configured to remove the ears of corn from the corn plants and collect the ears intact within the pickers. The collected ears of corn may then be transported to production sites via one or more tucks, still intact to help protect the kernels during transport and inhibit undesired loss of kernels, whereat the ears of corn are de-husked and dried and the kernels are then removed from the cobs (again, all in accordance with the harvest plan). Alternatively (or additionally), where the pickers include combine harvesters, the pickers may be configured to harvest the corn plants in the fields (e.g., designated for seed corn production, etc.), whereby the ears of corn removed from the corn plants are de-husked and shelled onboard the combine harvesters. The kernels of corn are then removed from the combine harvesters to trucks (via dump carts, etc.) for transport to production sites, where the separated kernels are dried and stored (e.g., as supplies of seed corn, etc.) (again, all in accordance with the harvest plan).

That said, as part of the harvesting operation of the pickers, data may be generated relating to the harvest of the fields (e.g., percent of field harvested, yield, moisture, etc.) and compiled (e.g., at the pickers or apart therefrom). At intervals, the pickers may be configured to report the harvest to the platform 112, whereby the platform 112 is configured to update the harvest data (and generate corresponding interfaces regard the same for display to one or more users (see, e.g., the interfaces of FIGS. 6-19 described herein)).

It should be appreciated that the platform 112 is configured to operate as described above at any suitable interval. For example, the platform 112 may be configured to generate a harvest plan as described above daily, or weekly, or otherwise. The platform 112 is then configured to re-generate the harvest plan at the interval. In doing so, changes in the fields, pickers, dryers, etc., are accounted for as the platform 112 generates the harvest plan. For example, as fields are harvested (or not harvested due to weather), the data structure 118 reflects the same, whereby the data input (and subject to the decision service 120) is different. Further, as the number of fields that are harvested during the harvest time increases, the number of fake pickers is decreased, and the number of potential allocations is also decreased. Each time the harvest plan is generated, the platform 112 is configured, again, to store the harvest plan and to implement the harvest plan.

It should also be appreciated that the constraints herein may be altered as needed to ensure a harvest plan is generated, as can be the thresholds applied at each stage.

Further, it should be understood that as data is passed from the pickers 106a-d to the platform 112 (or to the data structure 118), or as data is passed from the production site 110 to the platform 112, the data is transmitted via one or more networks. The one or more networks may include, without limitation, a local area network (LAN), a wide area network (WAN) (e.g., the Internet, etc.), a mobile/cellular network, a virtual network, and/or another suitable public and/or private network capable of supporting communication among two or more of the parts illustrated in FIG. 1, or any combination thereof. For example, each of the pickers 106a-d, the moisture meter 116, the truck 108, the production site 110, etc. may be configured to communicate with the platform 112 via one or more of the networks, and may further be configured to communicate with each other (also via one or more networks).

Figure 4:
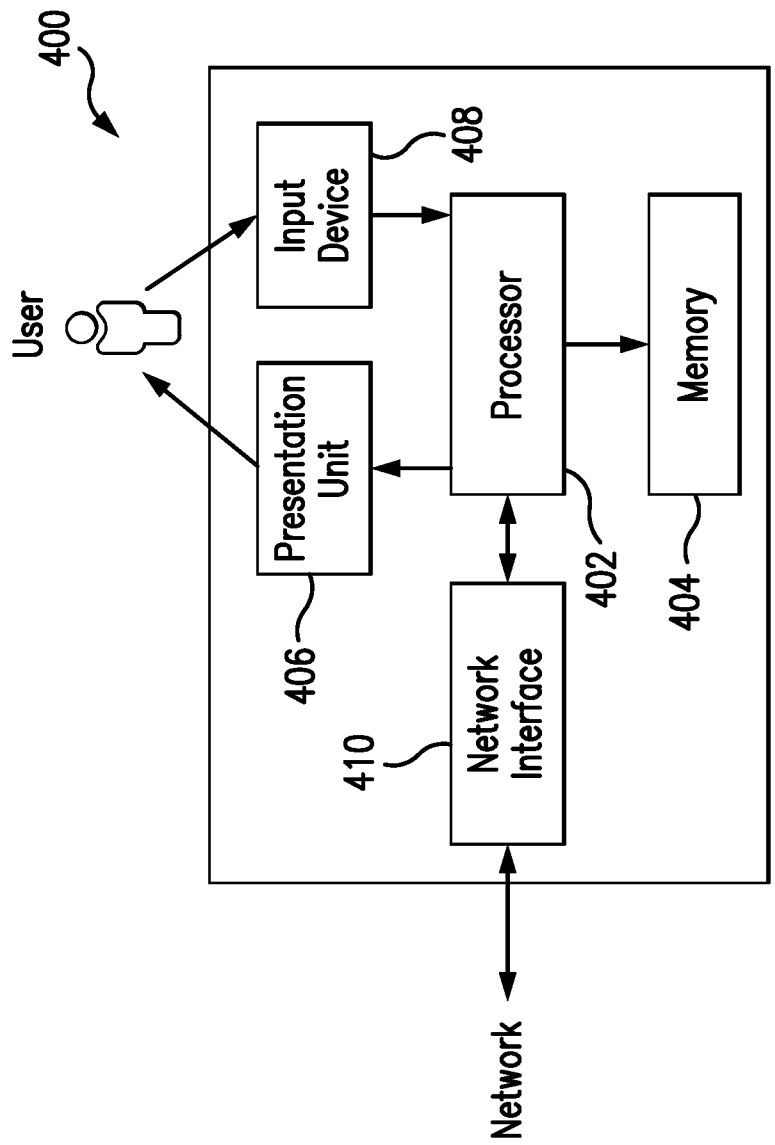
FIG. 4 is a block diagram of an example computing device that may be used in the system of FIG. 1.

FIG. 4 illustrates an example computing device 400 that can be used in the system 100. The computing device 400 may include, for example, one or more servers, workstations, personal computers, laptops, tablets, smartphones, PDAs, virtual devices, etc. In addition, the computing device 400 may include a single computing device, or it may include multiple computing devices located in close proximity or distributed over a geographic region, so long as the computing devices are specifically configured to function as described herein. In the example embodiment of FIG. 1, each of the pickers 106a-d, the truck 108, the production site 110, the platform 112, and the moisture meter 116 is implemented in and/or includes a computing device consistent with the computing device 400. With that said, the system 100 should not be considered to be limited to the computing device 400, as described below, as different computing devices and/or arrangements of computing devices may be used. In addition, different components and/or arrangements of components may be used in other computing devices.

Referring to FIG. 4, the example computing device 400 includes a processor 402 and a memory 404 coupled to the processor 402. The processor 402 may include one or more processing units (e.g., in a multi-core configuration, etc.). For example, the processor 402 may include, without limitation, one or more processing units such as a central processing unit (CPU), a microcontroller, a reduced instruction set computer (RISC) processor, an application specific integrated circuit (ASIC), a programmable logic device (PLD), a gate array, and/or any other circuit or processor capable of the functions described herein (alone or in combination).

The memory 404, as described herein, is one or more devices that permit data, instructions, etc., to be stored therein and retrieved therefrom. The memory 404 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 404 may include one or more data structures and may be configured to store, without limitation, field data (e.g., a type and quality of crop/plant (e.g., a hybrid, etc.) planted per field, boundary data, etc.), yield data, demand profiles for crops/plants to be harvested, data relating to the pickers 106a-d (e.g., speed, etc.), and/or other types of data suitable for use as described herein.

Furthermore, in various embodiments, computer-executable instructions may be stored in the memory 404 for execution by the processor 402 to cause the processor 402 to perform one or more of the functions described herein (e.g., in the method 500, etc.), such that the memory 404 is a physical, tangible, and non-transitory computer readable storage media. Such instructions often improve the efficiencies and/or performance of the processor 402 that is operating as described herein (e.g., performing one or more of the operations of the method 500, etc.) whereby upon such performance of the one or more functions, the computing device 400 may be considered (or transformed into) a unique, special purpose device. It should be appreciated that the memory 404 may include a variety of different memories, each implemented in one or more of the functions or processes described herein.

In the example embodiment, the computing device 400 also includes a presentation unit 406 that is coupled to (and is in communication with) the processor 402 (however, it should be appreciated that the computing device 400 could include output devices other than the presentation unit 406, etc.). The presentation unit 406 may output information (e.g., one or more interfaces as described herein, harvesting instructions as described herein, etc.), visually or otherwise, to a user of the computing device 400, such as an operator of a harvesting device, a grower associated with one or more fields being harvested, the service 120, etc. In connection therewith, it should be further appreciated that various interfaces (e.g., as defined by network-based applications, websites, etc.) may be displayed at computing device 400, and in particular at presentation unit 406, to display certain information to the user. The presentation unit 406 may include, without limitation, a liquid crystal display (LCD), a light-emitting diode (LED) display, an organic LED (OLED) display, an "electronic ink" display, speakers, etc. In some embodiments, presentation unit 406 may include multiple devices. Additionally or alternatively, the presentation unit 406 may include printing capability, enabling the computing device 400 to print text, images, and the like on paper and/or other similar media.

In addition, the computing device 400 includes an input device 408 that receives inputs from the user (i.e., user inputs). The input device 408 may include a single input device or multiple input devices. The input device 408 is coupled to (and is in communication with) the processor 402 and may include, for example, one or more of a keyboard, a pointing device, a mouse, a stylus, a touch sensitive panel (e.g., a touch pad or a touch screen, etc.), or other suitable user input devices. It should be appreciated that in at least one embodiment an input device 408 may be integrated and/or included with an output device or presentation unit 406 (e.g., a touchscreen display, etc.).

Further, the illustrated computing device 400 also includes a network interface 410 coupled to the processor 402 and the memory 404. The network interface 410 may include, without limitation, a wired network adapter, a wireless network adapter, a mobile network adapter (e.g., an NFC adapter, a Bluetooth adapter, etc.), or other device capable of communicating to one or more different networks. Further, in some example embodiments, the computing device 400 may include the processor 402 and one or more network interfaces (e.g., network interface 410, etc.) incorporated into or with the processor 402.

Figure 5:
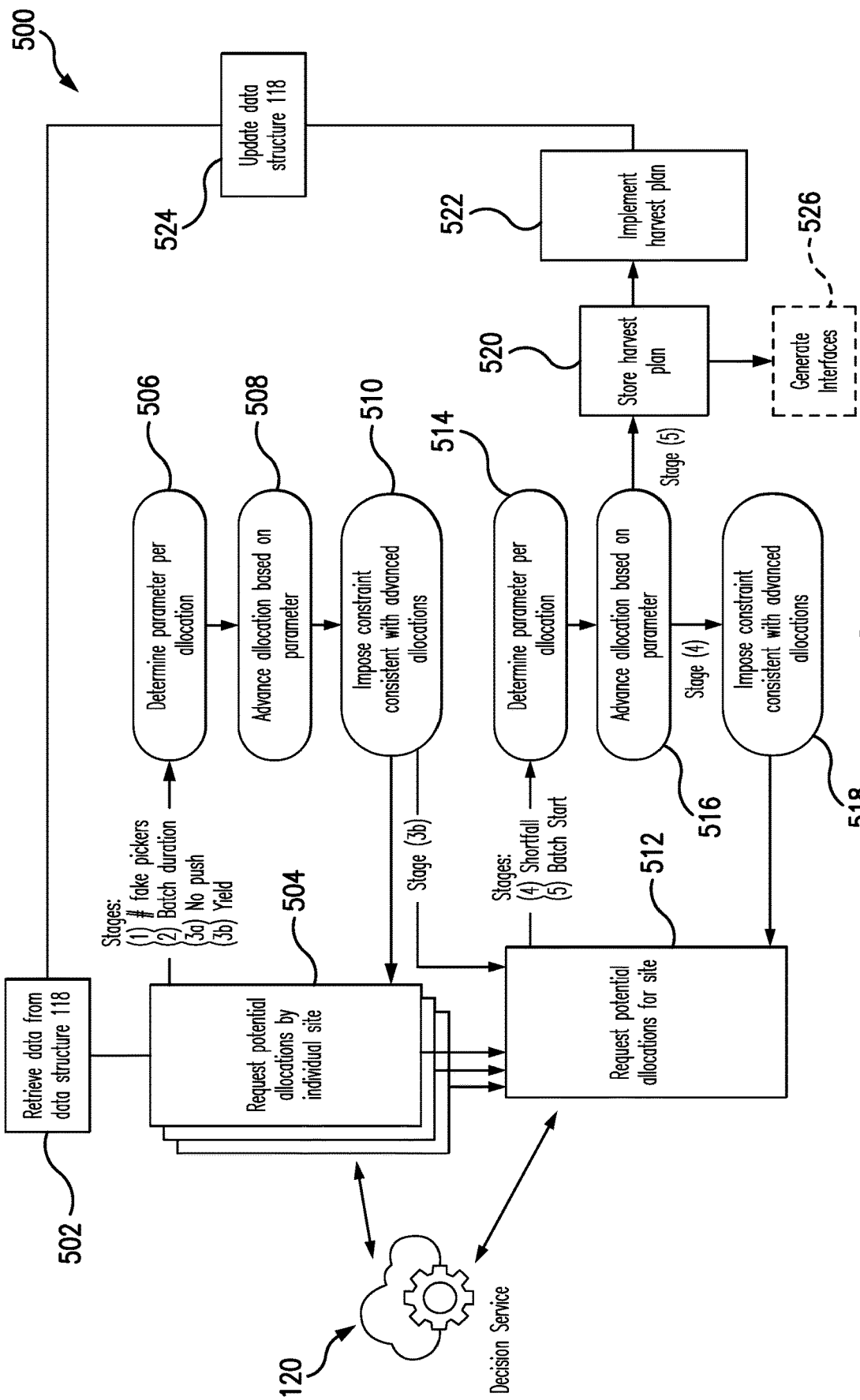
FIG. 5 is an example method, suitable for use with the system of FIG. 1, for enhancing harvest scheduling of fields, in which various factors associated with the harvesting of the fields are integrated and prioritized into the harvest scheduling.

FIG. 5 illustrates an example method 500 for enhancing scheduling with regard to harvesting crops from fields, and in which various factors associated with the crops and one or more resources associated with the harvesting may be integrated and prioritized. The example method 500 is described with reference to the system 100 of FIG. 1 as implemented in the platform 112 thereof, and as based on data associated with the fields 104a-f, the pickers 106a-d, the production site 110, etc., and also with reference to the computing device 400. However, it should be understood that the methods herein are not limited to the example system 100 or the example computing device 400. Likewise, the systems and the computing devices herein should not be understood to be limited to the example method 500.

At the outset in the method 500, the platform 112 retrieves, at 502, data relating to generating the desired schedule for the fields 104a-f, for the first field site (or field scenario), and also the associated data for other sites (each having fields with crops for harvest, pickers, etc.) from the data structure 118. This data includes, without limitation, for example, characteristics of the fields 104a-f (e.g., moisture content of the fields and/or the crops in the fields, hybrids growing in the fields, etc.), groupings of the fields 104a-f, operational data of the pickers 106a-d, and operational data of the production site 110 (e.g., including a number of shellers and a number of dryers available, etc. depending on a type of crop to be processed at the production site 110; etc.), and/or more specifically, picker speeds for the pickers 106a-d, types and qualities of crops in the fields 104a-f, moisture content and/or modeling for the crops in the fields 104a-d, batch definitions by field, dryer capacities and/or times at the production site 110, demand profiles for the crops, location data for the fields 104a-f and/or pickers 106a-d, etc.

Thereafter, the platform 112 generates (e.g., via steps 504-518 as described next, etc.) a harvest plan that provides a desired yield, such as, for example, a maximum yield, an optimum or optimized yield, etc., given the particular constraints desired to be applied (e.g., as defined in Tables 3-7, etc.).

In general, as shown, the method 500 includes two separate parts (or groups of stages), a first in which different field sites (or field scenarios) are addressed separately (e.g., steps 504-510 relating to stages (1) to (3b) (e.g., individual site stages, etc.), etc.) and a second in which the field sites (or field scenarios) are addressed in the aggregate (together) (e.g., steps 512-518 relating to stages (4) to (5) (e.g., all-site stages, etc.), etc.). It should be appreciated that, in one or more embodiments, the harvest plan may be generated per site, or together whereby the number of stages (if any) where the field sites are separate and/or aggregated may be more or less.

In the first part, for each of the field sites, the platform 112 determines, at 504, a set of potential allocations of pickers to fields, through the decision service 120. The decision service 120 is provided the data retrieved form the data structure 118, or part thereof, and the initial constraints, which include, in this embodiment, ones of the constraints included in Tables 3-7 above. As part thereof, the platform 112 may, for example, provide a matrix of pickers and fields, which is indicative of the distance(s) therebetween. Further, at this initial request for potential allocations, the platform 112 limits the allocations to pickers assigned to fields (e.g., whereby timing of the pickers at the fields is omitted, as is other variables of the final harvest plan; etc.). Based on the inputs from the platform 112, including the constraints and data (e.g., distance between fields and pickers, etc.), etc., the decision service 120 determines and provides a series of potential allocations to the platform 112. It should be appreciated that, in doing so, the decision service 120 may use slack variables (e.g., fake pickers, etc.) in the potential allocation, as needed, to prevent infeasibilities among the different allocations (e.g., to avoid possible scenarios where insufficient numbers of pickers are available, where a capacity at the production site 110 is insufficient, etc.), etc.

The platform's request at 504 is specific to one field site. As such, the platform 112 separately and simultaneously, or not, may proceed in the same manner (e.g., for steps 504-510, for each stage) for each of the sites (e.g., for the three sites or scenarios included in FIG. 1 (including scenario 102), etc.) to be included in the harvest plan.

That said, in response to the series of potential allocations, the platform 112 proceeds with a first stage or stage (1), and at 506, in the first stage, the platform 112 determines a specific parameter per allocation from the decision service 120. The first stage as shown includes a number of fake pickers (included in the allocation) as the parameter, whereby the platform 112 in the first stage determines a number of fake pickers (per equation (1)). Then, at 508, the platform 112 advances certain ones of the allocations based on the number of fake pickers (generally minimizing or limiting the number of fake pickers). More specifically, in this embodiment, the platform 112 employs a threshold, whereby each allocation with fewer than the threshold number of fake picker is advanced. The platform 112 then imposes one or more constraints consistent with the advanced allocation on a next series of potential allocations, at 510. In the first stage, the platform 112 determines consistency of the pickers and fields across the advanced allocations, and imposes constrains on those pickers by assigning the pickers to the respective fields in the next series of potential allocations. The first stage (1) is then complete.

The platform 112 then requests, at 504, the next series of potential allocations, from the decision service 120, and further provides the imposed constraint(s) from the first stage (1), at step 510. In response, the decision service 120 again provides the potential allocations, which now includes timing of the harvest of the different fields in the field site, and proceeds to the second stage (2).

At the second stage (2), the parameter is batch duration, whereby the platform 112 determines, at 506, a batch duration of each of the allocations from the decision service 120 (per equation (3)). Then, at 508, the platform 112 advances certain ones of the allocations based on the duration of the batches (generally minimizing or limiting the duration). More specifically, in this embodiment, the platform 112 employs a threshold, whereby each allocation with a duration less than the threshold is advanced. The platform 112 then imposes one or more constraints consistent with the advanced allocation, which is consistent with equation (10), below, on a next series of potential allocations, at 510. It should be appreciated that 0 (as a threshold), in equation (10), may be selected and/or defined based on, for example, empirical data related to historical harvest data, predicted throughput of potential allocations to a next stage, harvest conditions and/or data, etc.

$$\sum_{\forall b \in batches} SAPBatchDuration_b \geq \emptyset \qquad (10)$$

where $\emptyset$ is a parameter

In the second stage (2), the platform 112 determines consistency of the bulk batches across the advanced allocations, and imposes constraints on those batches by assigning the batches to be harvested together in the next series of potential allocations. The second stage (2) is then complete.

The platform 112 then requests, at 504, the next series of potential allocations, from the decision service 120, and further provides the imposed constraint(s) from the second stage (2), at step 510. In response, the decision service 120 again provides the potential allocations (again per individual field site, as illustrated in FIG. 5), with the multiple pickers 106a-d assigned to fields 104a-f, etc., and with the batches amongst the fields fixed and defined (e.g., by grouping, time, priority, etc.).

At the first portion of the third stage (3a), the parameter is priority batch of moisture content, whereby the platform 112 determines, at 506, which fields can and cannot be pushed according to an expected moisture content by time (and a desired moisture range for harvest) for each of the allocations from the decision service 120 (per equation (4)). Then, at 508, the platform 112 advances certain ones of the allocations based on the designation of the fields (generally minimizing or limiting the number of fields outside the desired moisture range for harvest). More specifically, in this embodiment, the platform 112 employs a threshold, whereby each allocation with number of push days less than the threshold is advanced. The platform 112 then imposes one or more constraints consistent with the advanced allocation, as indicated in equation (11), below, on a next series of potential allocations, at 510.

$$\Sigma_{f \in fields, pushDays_f=0, t \in harvestTime_f, t < MP_f \cdot pushDays_f} MPBin_{f,t} \leq |\{f | f \in fields: pushDays_f = 0\}| \quad (11)$$

In the first portion of the third stage (3a), the platform 112 determines a precedence of certain fields over others in the advanced allocations, and imposes constraints to prioritize those fields in the next series of potential allocations. The first portion of the third stage (3a) is then complete.

The platform 112 then requests, at 504, the next series of potential allocations, from the decision service 120, and further provides the imposed constraint(s) from the first portion of the third stage (3a), at step 510. In response, the decision service 120 again provides the potential allocations (per individual field site as indicated in FIG. 5), with the multiple pickers assigned to the fields, the batches fixed and defined, and further hybrids prioritized based on push/no-push rules.

At the second portion of the third stage (3b), the parameter is priority yield, whereby the platform 112 determines, at 506, a yield for each of the allocations from the decision service 120 (per equation (5)), based on time, picker speed, moisture-yield curve, etc. Then, at 508, the platform 112 advances certain ones of the allocations based on the yield (generally maximizing or improving the yield). More specifically, in this embodiment, the platform 112 employs a threshold, whereby each allocation with yield above (or equal to) the threshold is advanced. The platform 112 then determines a lower bound for the yield (per the equation (6) above) and then imposes constraint(s) consistent with a lower bound for the yield output of the field site (e.g., fields 104a-f, etc.) on a next series of potential allocations, at 510. The second portion of the third stage (3b) is then complete.

As shown in FIG. 3, upon completion of stages 1, 2, 3a, and 3b, the platform 112 proceeds to step 512, in which the different field sites are combined or aggregated together. In particular, all the constraints for the different field sites, on the different fields, pickers, yields, batches, etc., are combined.

At 512, the platform 112 then requests the next series of potential allocations, from the decision service 120, and further provides the constraint(s) imposed originally and those from the above stages. In response, the decision service 120 again provides the potential allocations, which include, consistent with the above, local allocations based on each individual field site.

At the fourth stage (4), the parameter is shortfall, which is the difference between a demand volume and an expected harvest volume, whereby the platform 112 determines, at 514, the shortfall for each of the allocations from the decision service 120 (per equation (7)). Then, at 516, the platform 112 advances certain ones of the allocations based on the shortfall (generally minimizing or limiting the shortfall). More specifically, in this embodiment, the platform 112 employs a threshold, whereby each allocation with a shortfall below the threshold is advanced. The platform 112 then determines a product priority based on the supply and demand and imposes a relevant constraint (as part of stage four (4)), as indicated in equation (8) (reproduced below), on a next series of potential allocations, at 518. Thereafter, the fourth stage (4) is then complete.

$$realVolDiffPos_{h,l} \geq$$
$$supply_{l,h} - \sum_{p} \sum_{f} \sum_{t} yieldMoisture_{f,t} \times acres_f \times dailyHarvestHrs \times$$
$$pickerSpeed \times harvestFraction_{p,f,t}$$
$$\forall\, h \in hybrids,\, l \in demandLevels$$

As shown in FIG. 5, the platform 112 then requests, at 512, the next series of potential allocations, from the decision service 120, and further provides the imposed constraint(s) from the fourth stage (4), at step 518. In response, the decision service 120 again provides the potential allocations (for all field sites together, as illustrated in FIG. 5), with the multiple pickers assigned to the fields, batches fixed and defined, hybrids prioritized, and further prioritization refined and/or iterated to provide for balance for supply and demand.

At the fifth stage (5), the parameter is batch start days, whereby the platform 112 determines, at 514, a number of batch start days for each of the allocations from the decision service 120 (per equation (9)). Then, at 516, the platform 112 advances one of the allocations based on the number of batch start days (generally minimizing or limiting the number of batch start days) (e.g., where the advanced allocation includes or is the harvest plan for the given iteration of the method 500, etc.). The platform 112 then stores, at 520, the advanced allocation as the harvest plan for the field site(s). The harvest plan may be stored in the data structure 118, for example, or another data structure accessible to the field site(s) or resources thereof, or others.

The platform 112 then implements, at 522, the harvest plan in the one or more fields 104a-f (of the field scenario (or site) 102), in the pickers 106a-d, the truck 108 and the production site 110, etc., and generally, at all field sites. The harvest plan is generally implemented through instructions to individual field sites, (or hubs associated with the field sites), whereby personnel at the sites impose the harvest schedule (for the site) on the pickers and personnel associated with the site. For example, based on the harvest plan, the platform 112 and/or hub may direct particular pickers to particular fields and the pickers may then harvest crops/plants from the fields. The platform 112 and/or hub may also direct trucks to collect the harvested crops/plants, and to transport the crops/plants to desired production sites for processing (e.g., drying, storage, etc.), again in accordance with the harvest plan. The harvest plan is thereby implemented, and crops/plants are harvested and processed based thereon. For example, where the plants/crops include corn plants and where the pickers include ear pickers, the pickers may be configured to remove the ears of corn from the corn plants and collect the ears intact within the pickers. The collected ears of corn may then be transported to production sites via one or more tucks, still intact to help protect the kernels during transport and inhibit undesired loss of kernels, whereat the ears of corn are de-husked and dried and the kernels are then removed from the cobs. Alternatively (or additionally), where the pickers include combine harvesters, the pickers may be configured to harvest the corn plants in the fields (e.g., designated for seed corn production, etc.), whereby the ears of corn removed from the corn plants are de-husked and shelled onboard the combine harvesters. The kernels of corn are then removed from the combine harvesters to trucks (via dump carts, etc.) for transport to production sites, where the separated kernels are dried and stored (e.g., as supplies of seed corn, etc.).

Optionally in the method 500, as indicated by the dotted lines in FIG. 5, the platform 112 may also generate one or more interfaces, at 524, for display to a user (e.g., to a grower associated with one or more of the fields 104*a-f*, to an operator of one or more of the pickers 106*a-d*, etc.) (e.g., via presentation unit 406, etc.) relating to the given iteration of the harvest plan (as stored at step 520). In doing so, the one or more interfaces may provide insight into which fields included in the harvest plan, which crops (e.g., hybrids, etc.) included in the harvest plan, which batches of fields included in the harvest plan, etc. have higher priorities (e.g., according to moisture content, supply and demand fulfillment, etc.) and therefore required prior in harvesting, etc. The interfaces may also be customized or individualized to the user, for example, based on their particular needs, etc., so that the user understands what actions are needed at the given time of generation of the harvest plan. That said, the interfaces generated at step 524 may include, for example, one or more of the interfaces illustrated in FIGS. 6-19, etc.

Figure 6:
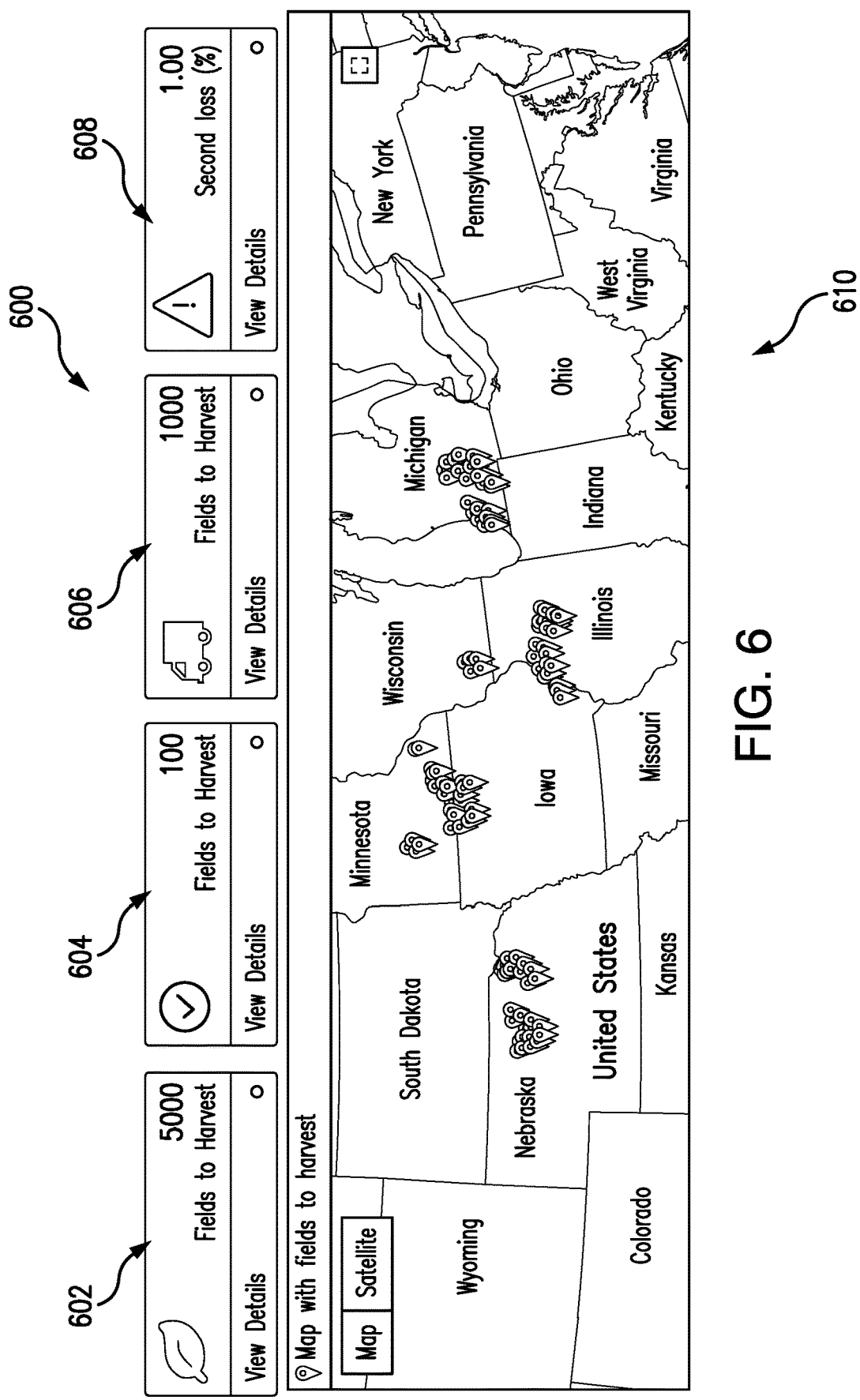
FIGS. 6-7 illustrate example dashboard interfaces that may be generated by the system of FIG. 1 and/or the method of FIG. 5 in connection with harvest scheduling herein.

In connection therewith, FIG. 6 illustrates an example dashboard interface 600 that may be displayed to a user (e.g., a grower, an operator, etc. at computing device 400; etc.) in connection with a generated harvest plan (e.g., as generated and stored at step 520 in method 500, etc.). As shown, the dashboard interface 600 includes an option 602 to view details relating to fields in the harvest plan to be harvested (as of a date of generation of the harvest plan), an option 604 to view details relating to fields that have already been harvested (as of a date of generation of the harvest plan), an option 606 to view details relating to trucks that have been unloaded (in connection with harvested crops to date), and an option 608 to view details relating to a seed loss percentage across all fields in the harvest plan (based on implementation of the given harvest plan for corresponding harvesting dates, etc.). The interface 600 also includes a graphical representation (e.g., map 610, etc.) representing/illustrating locations of the fields included in the harvest plan. That said, the dashboard interface 600 may include other data/information in other embodiments (e.g., a date/time the harvest plan was generated, harvesting dates/times included in the harvest plan, etc.).

Figure 7:
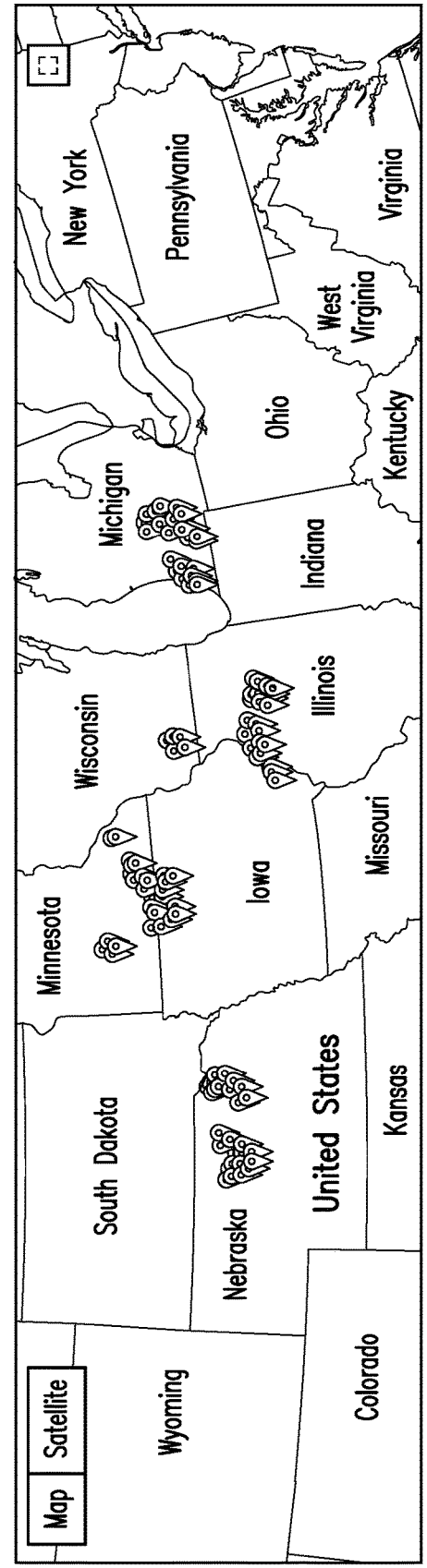

FIG. 7 illustrates an example interface 700 that may be displayed to the user, for example, upon selection of the option 602 (in the interface 600) to view details of the fields in the harvest plan that have yet to be harvested. In the illustrated example, the interface 700 includes a chart or tabular representation of each of the fields included in the generated harvest plan (illustrating various data included in the harvest plan, etc.). As shown, for instance, the interface 700 indicates (or includes), among other things, field identifiers (IDs), start harvest dates, end harvest dates, modeled harvest dates, picker identifiers (IDs), plant types (for planting as part of the harvest plan), total areas of the given fields, areas of the given fields to be harvested, total and harvested standard seed units (SSUs) (e.g., where a SSU may equal about 80,000 seeds or one bag of seeds, etc.) for the given fields, harvest lateness (e.g., in days, etc.), and expected moisture of the field/crop at harvest (e.g., at the model harvest date, etc.). The interface 700 then also includes the map 610 again representing/illustrating the locations of each of the fields included in the harvest plan. Here, the user may select one of the field entries in the chart or table, whereby a location of the selected field entry may then be highlighted or emphasized in the map 610. It should be appreciated that the interface 700 may include additional or other data relating to the fields in the harvest plan in other embodiments.

Figure 8:
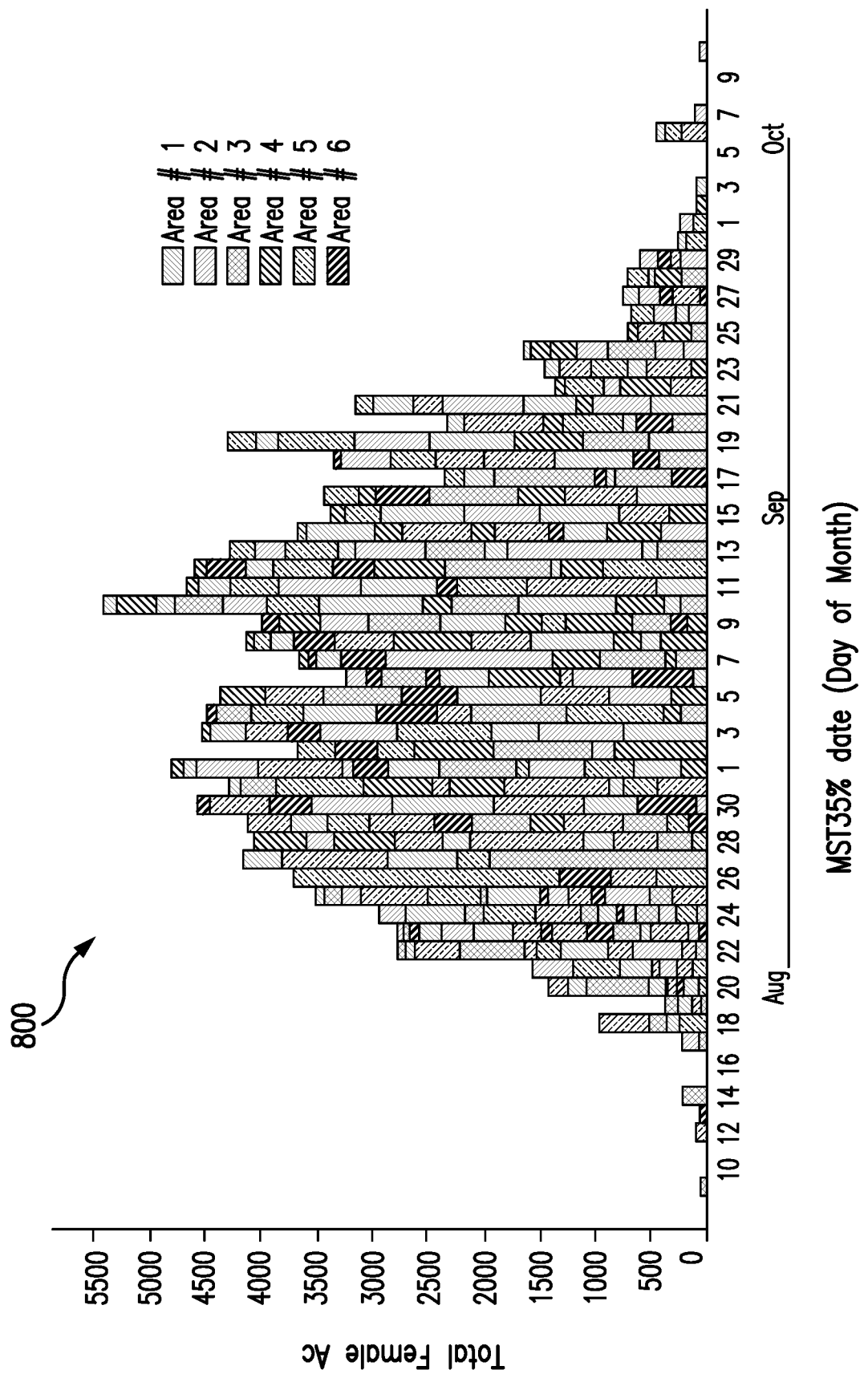
FIG. 8 illustrates an example interface including a graphical representation of a harvest plan generated via the system of FIG. 1 and/or the method of FIG. 5, for a given field scenario (or site)

FIG. 8 illustrates another example interface 800 that may also (or alternatively) be displayed to the user, for example, upon selection of the option 602, in the interface 600, to view details of the fields in the harvest plan that have yet to be harvested. In connection therewith, interface 800 includes a graphical representation of the harvest plan and the various fields included in the harvest plan (e.g., to be harvested on the indicated dates, etc.). The interface 800 includes, for example, the different areas or fields included in the given harvest plan, the scheduled (e.g., modeled, etc.) date of harvest for each of the fields, and a predicted yield from the harvest for each date (all at a specified moisture content of about 35 percent in this example). As fields in the harvest plan are actually harvested, the interface 800 may be updated (in subsequent iterations of the method 500 to generate updates to the harvest plan) to reflect actual yield for the fields on the given dates as well as predicted yield for fields that have not yet been harvested.

Figure 9:
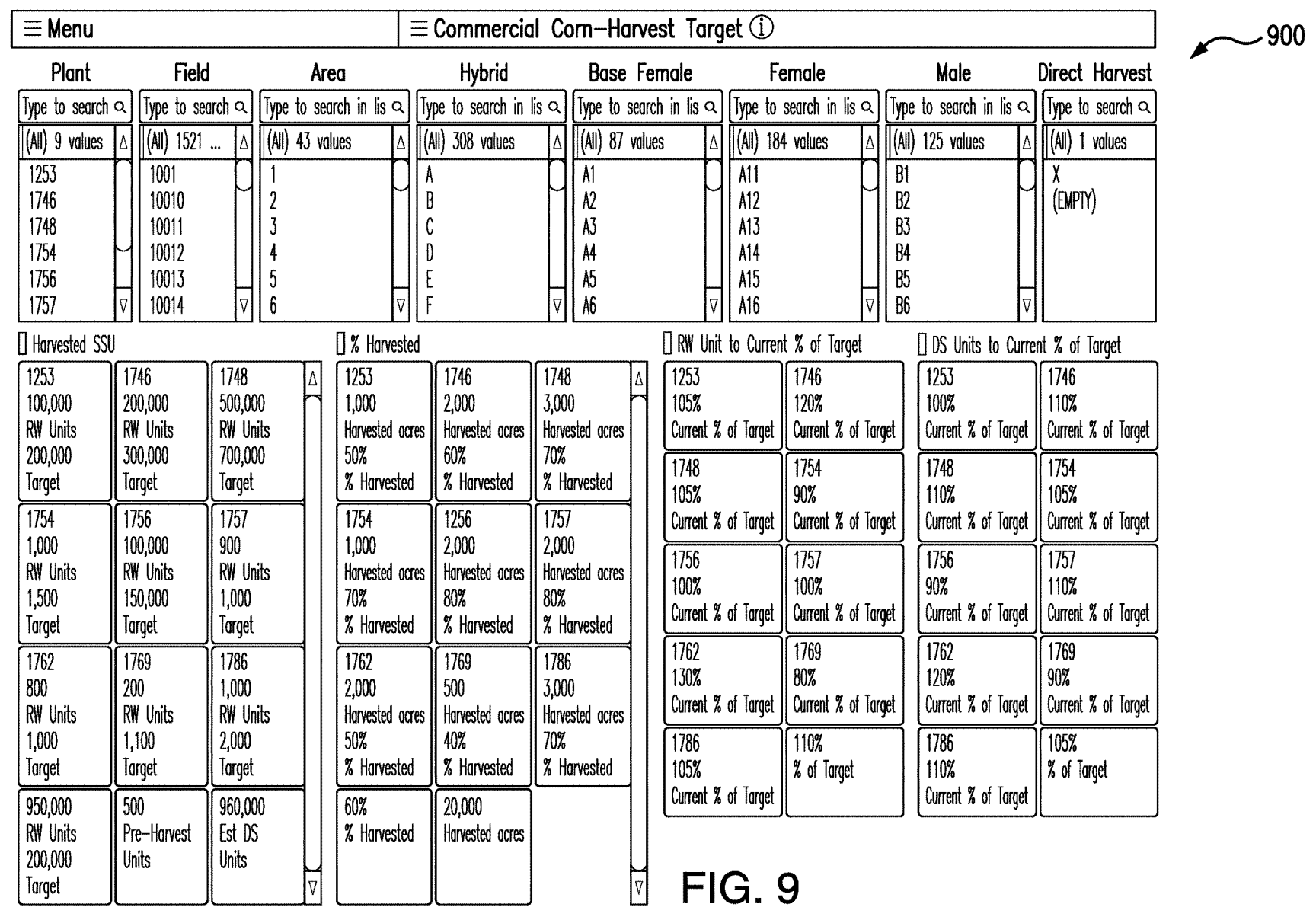

And, FIG. 9 illustrates another example interface 900 that may be displayed to the user, in connection with the generated harvest plan (e.g., as generated and stored at step 520 in method 500, etc.). The interface 900 generally illustrates harvest progression for the harvest plan for particular crops in the harvest plan. In particular in this example, the interface 900 illustrates a general cumulative trend of harvested units for each of the crops, and providing a comparison of current harvested amounts (e.g., as of a date of the given harvest plan, etc.) versus target amount. In some embodiments, the boxes in the interface 900 may include color coding (e.g., white, light blue, blue, dark blue, etc.) indicative of a relative number of harvested units, a relative percentage of harvested units, etc.

FIG. 10 illustrates an example weather interface 1000 that may be displayed to the user, in connection with implementation of the generated harvest plan (e.g., based on a selection from the dashboard interface 600 or from the dashboard interface 900 or from another dashboard interface, based on a selection from the interface 700, based on a selection from the interface 800, etc.). In this example, the weather interface 1000 includes weather data for each day included in the harvest plan (e.g., for a selected field from one of the interfaces herein, for the entire harvest plan, etc.). In connection therewith, the illustrated weather interface 1000 includes, for each day, a minimum (or low) daily temperature (Tmin), a maximum (or high) daily temperature (Tmax), a precipitation amount, and a narrative generally describing weather for the day. That said, it should be appreciated that additional weather data (e.g., wind, cloud cover, etc.) or other weather data may be included in the weather interface 1000 in other embodiments.

Figure 11:
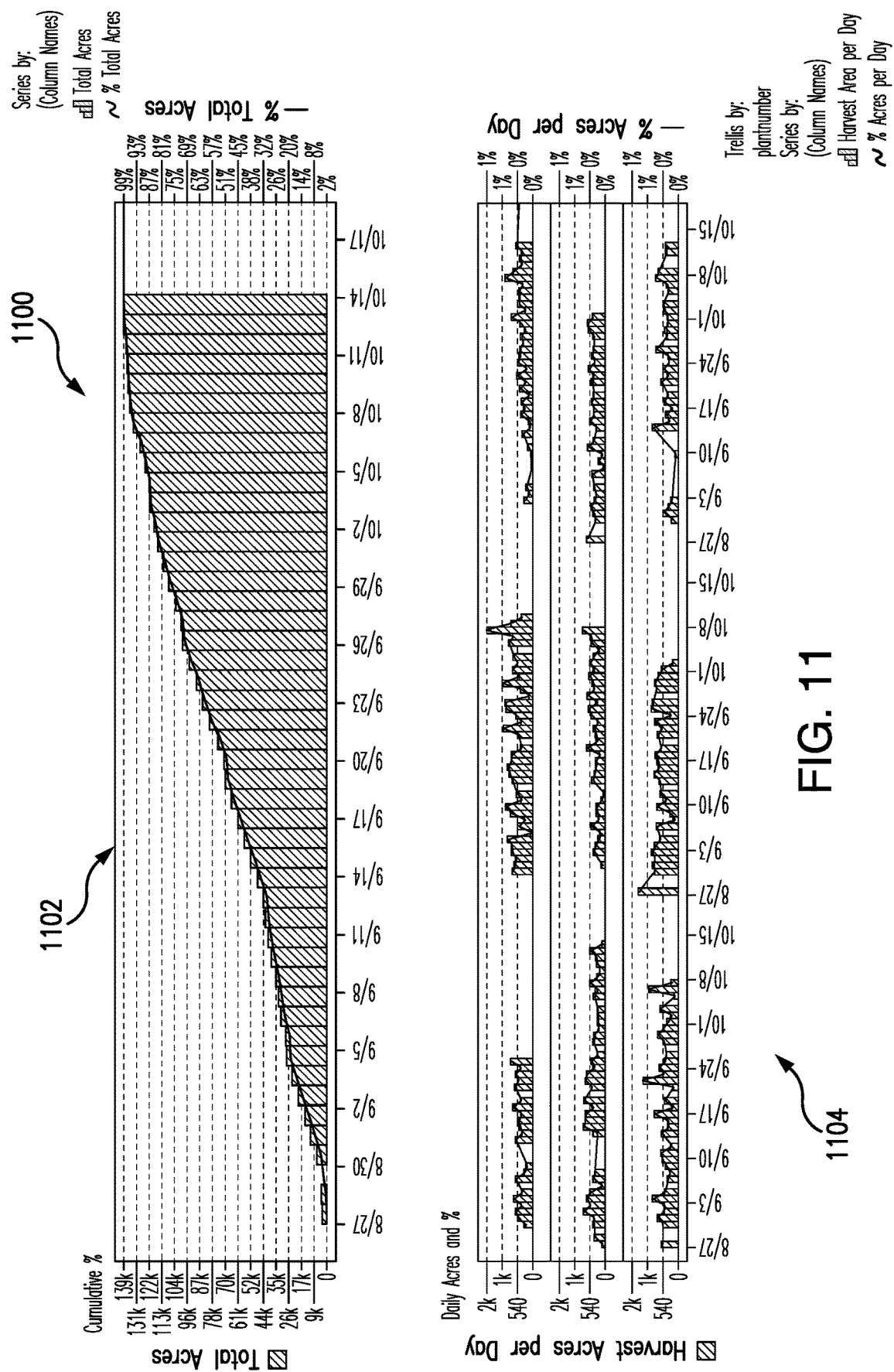
FIG. 11 illustrates another example interface that may be generated by the system of FIG. 1 and/or the method of FIG. 5, to show harvest progress for a harvest plan created herein.

FIG. 11 illustrates an example progress interface 1100 that may be displayed to the user, in connection with implementation of the generated harvest plan (e.g., based on a selection from the dashboard interface 600 or from the dashboard interface 900 or from another dashboard interface, based on a selection from the interface 700, based on a selection from the interface 800, etc.). In this example, the interface 1100 generally provides harvest progress for the harvest plan, as of the date of generation of the harvest plan, in terms of overall cumulative daily acres harvested and also in terms of an overall cumulative percent of daily acres harvested. In connection therewith, such progress is shown for all fields in the given harvest plan (at 1102), and also for the fields in each individual field site (or field scenario) within the harvest plan (at 1104). In this way, different granularity of progress associated with the harvest plan is provided to the user, for example, depending on a need, interest, etc. of the user.

Figure 12:
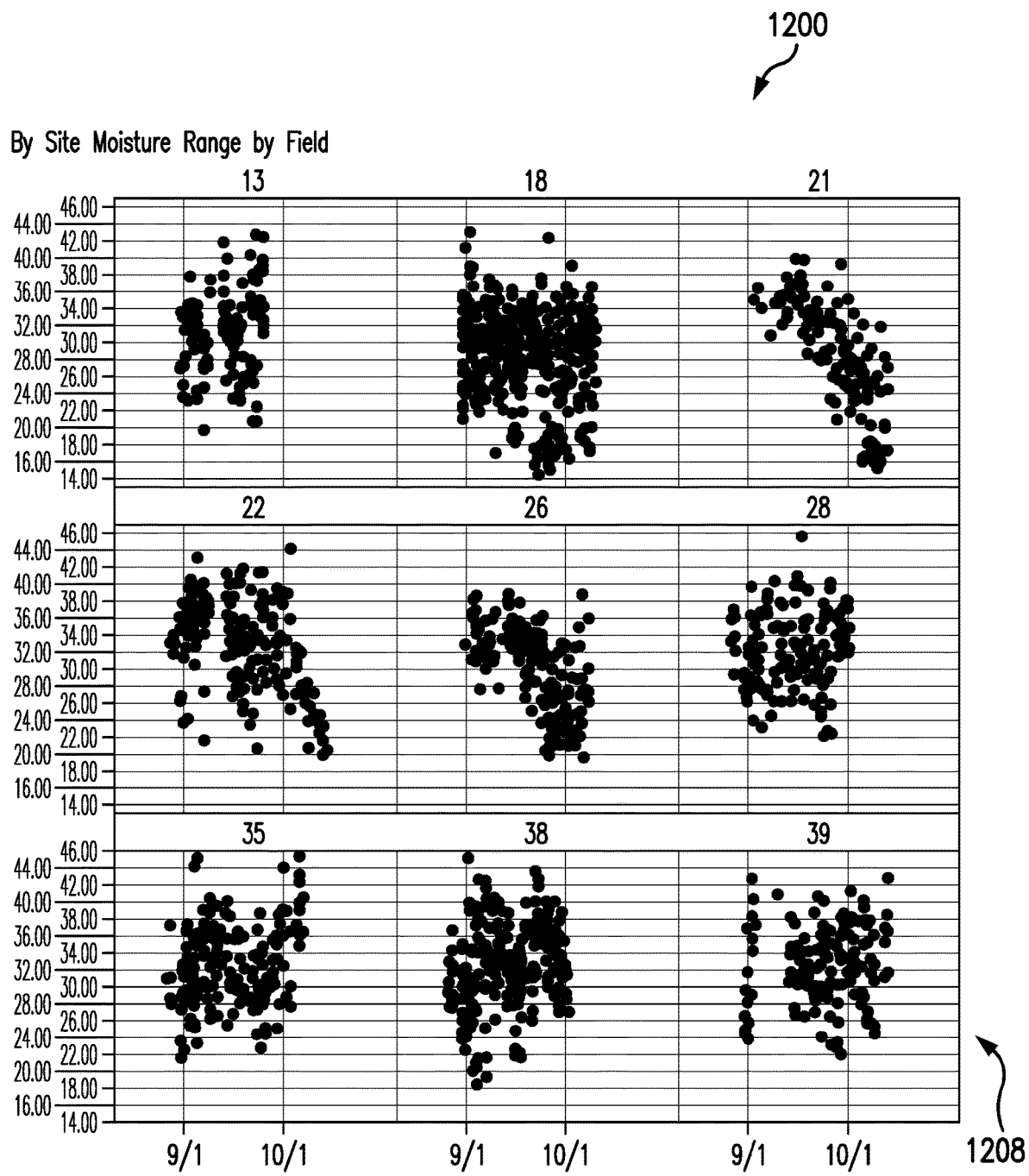
Figure 14:
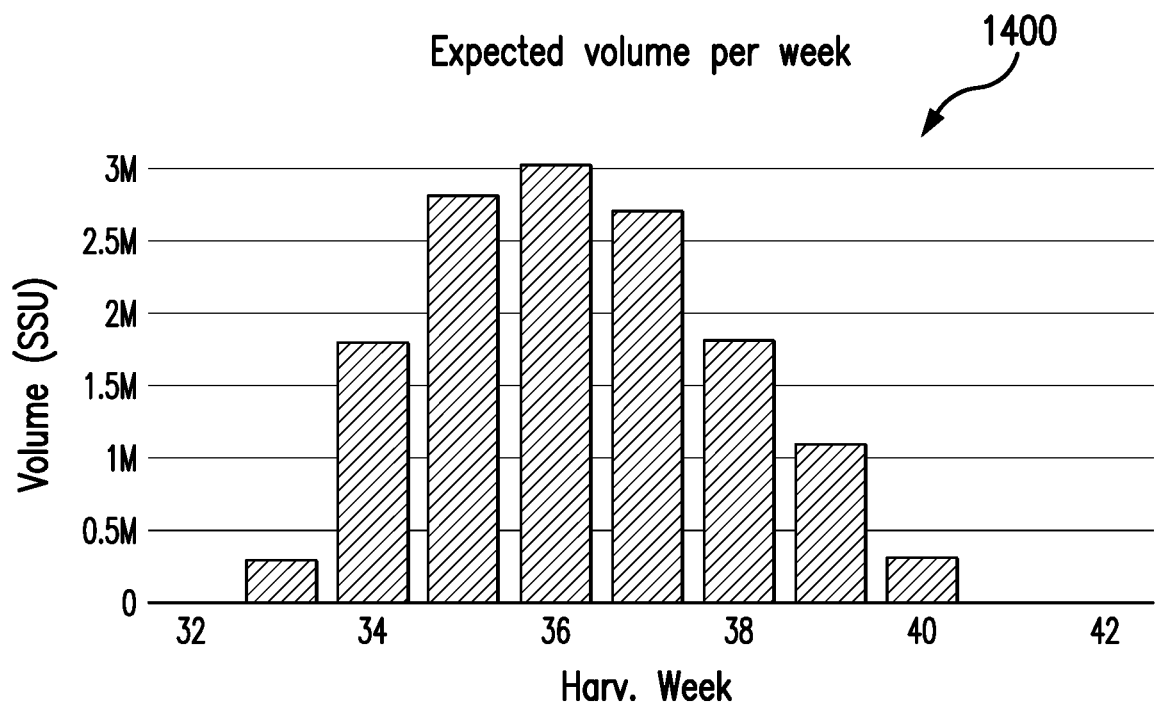
FIGS. 14-17 illustrate example interfaces that may be generated by the system of FIG. 1 and/or the method of FIG. 5, to show various daily and weekly statistics for a harvest plan created herein.
Figure 15:
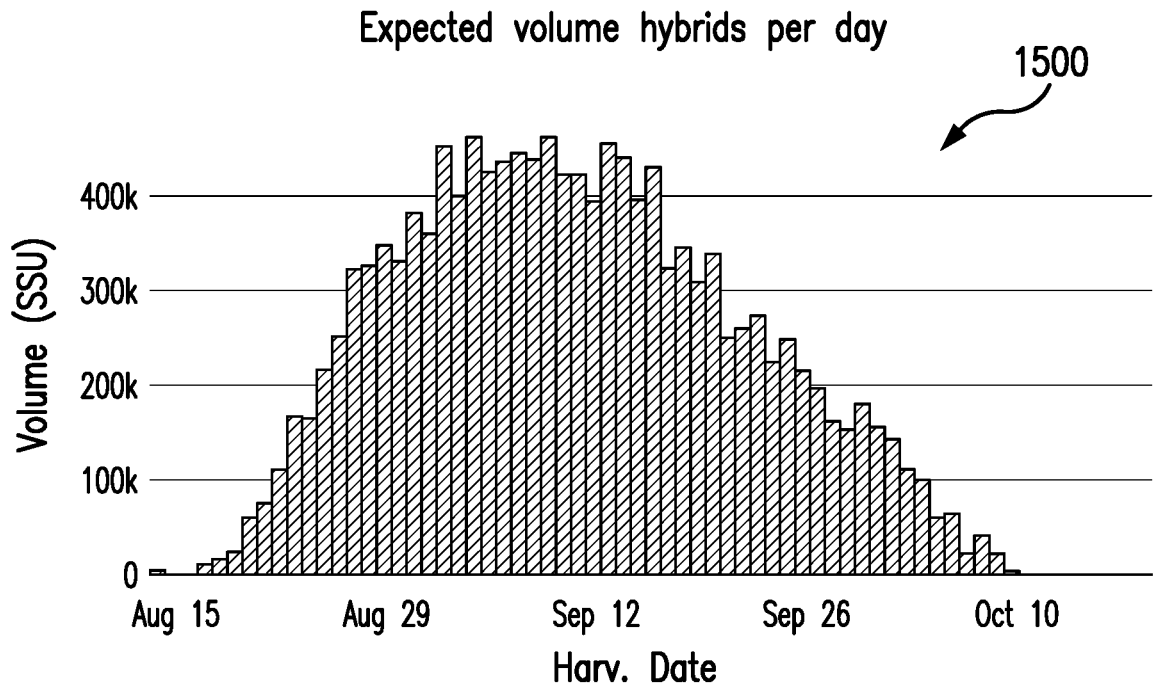
Figure 16:
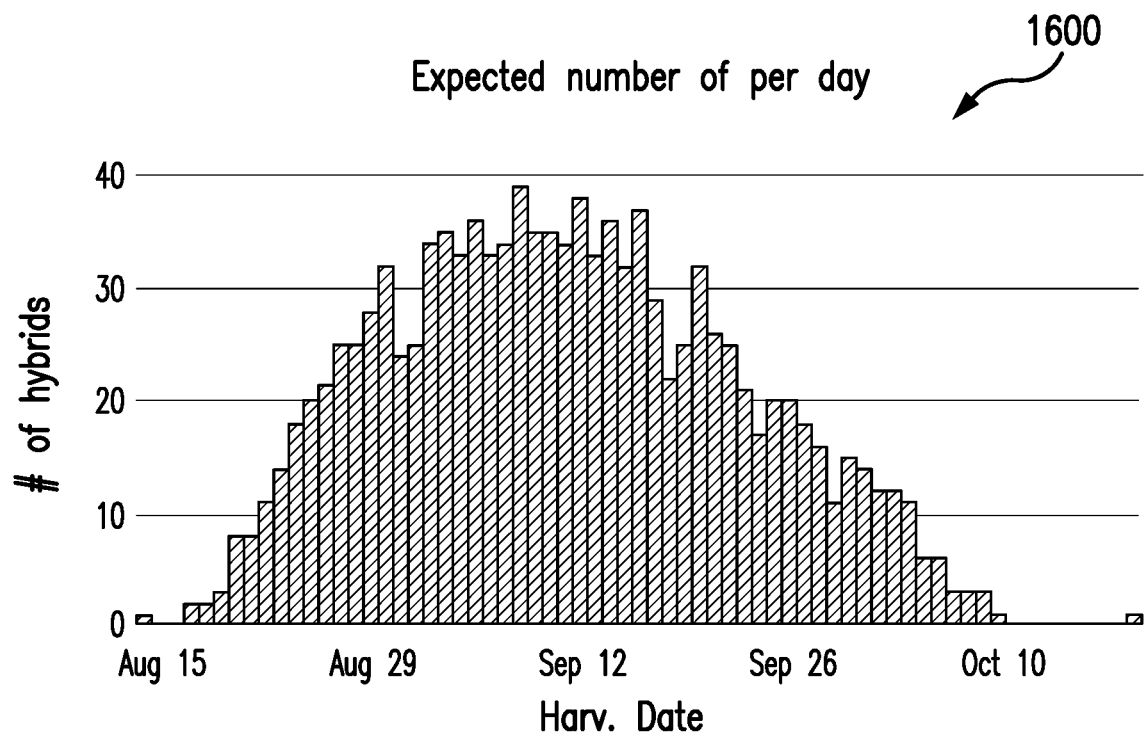
Figure 17:
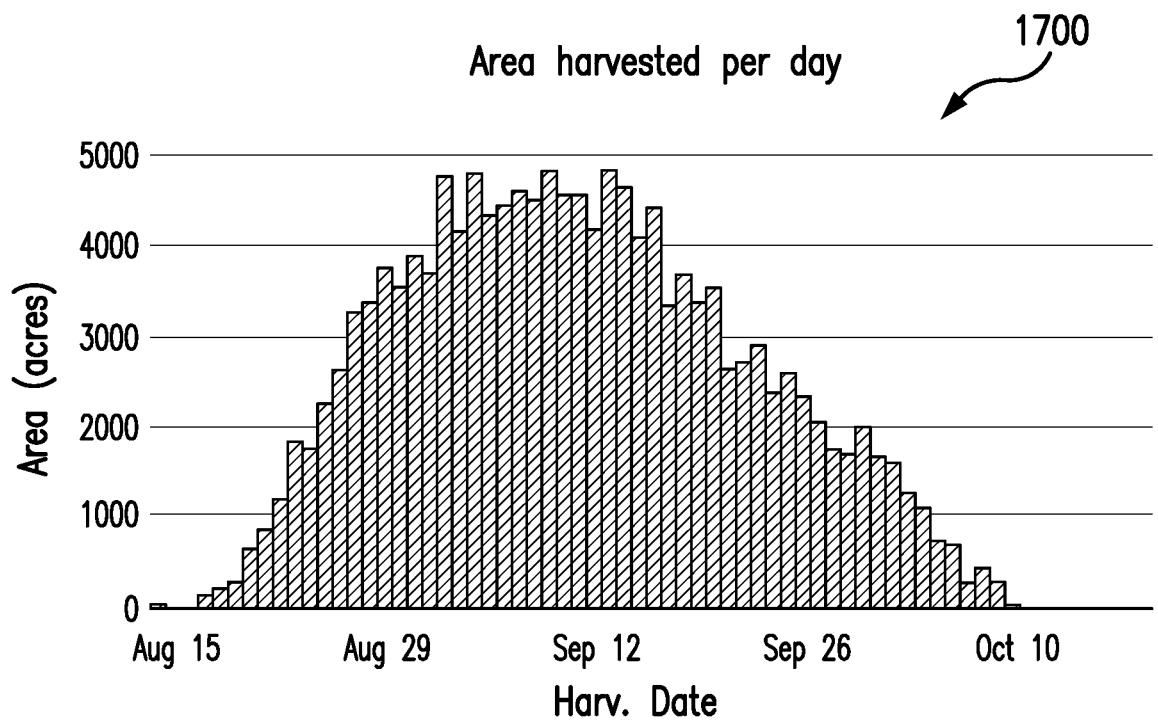

FIG. 12 illustrates an example moisture interface 1200 that may be displayed to the user, in connection with implementation of the generated harvest plan (e.g., based on a selection from the dashboard interface 600 or from the dashboard interface 900 or from another dashboard interface, based on a selection from the interface 700, based on a selection from the interface 800, etc.). In this example, the illustrated interface 1200 includes an overall average harvest moisture percentage (at 1202) for fields in the harvest plan that have been harvested and/or that are scheduled for harvest on given dates (e.g., 30.91 percent for 1744 total fields included in the harvest plan, etc.), as well as an average harvest moisture percentage (at 1204) for each of the field sites (or field scenarios) included in the harvest plan (e.g., 31.4% for the 134 fields included in field site 1, etc.). The illustrated interface 1100 also includes a graphical illustration (at 1206) of average moisture content for each harvested field in the harvest plan at the given date of harvest (where each field is represented by a dot), as well as a graphical illustration (at 1208) of average moisture content for each of the harvested fields grouped by field site (or field scenario) for the harvest plan. These graphical representations of moisture content may illustrate trends in harvest moisture for the overall harvest plan and for individual field sites within the harvest plan (e.g., indications of which corn fields were (or are planned to be) harvested via a combine at lower moisture content (e.g., below 20%, etc.), etc.). In some embodiments, filters may further be provided to distinguish between different harvest methods within the harvest plan, etc.

FIG. 13 illustrates another example moisture interface 1300 that may be displayed to the user, in connection with implementation of the generated harvest plan (e.g., based on a selection from the dashboard interface 600 or from the dashboard interface 900 or from another dashboard interface, based on a selection from the interface 700, based on a selection from the interface 800, etc.). The interface 1300 generally illustrates harvest moisture ranges for crops harvested in accordance with the harvest plan (and/or scheduled to be harvested in accordance with the harvest plan). More particularly, the interface 1300 illustrates, at 1302, a number of acres in the harvest plan harvested at each of a given two percent moisture content range (e.g., 14.00% to 16.00%, 16.00% to 18.00%, etc.). And, at 1304, the interface 1300 illustrates a total number of harvested units (e.g., standard bushel units (SBUs), etc.) for each two percent moisture range.

FIGS. 14-17 illustrate example interfaces 1400-1700 that may be displayed to the user, in connection with implementation of the generated harvest plan (e.g., based on a selection from the dashboard interface 600 or from the dashboard interface 900 or from another dashboard interface, based on a selection from the interface 700, based on a selection from the interface 800, etc.), to illustrate various daily and weekly statistics for the harvest plan. For instance, the interface 1400 illustrates an expected harvest volume (in SSU) per week taking into account the harvest plan (over a given harvesting period), while the interface 1500 illustrates an expected harvest volume (again in SSU) per day taking into account the harvest plan (over the given harvesting period). And, interface 1600 illustrates an expected number of hybrids harvested per day, and interface 1700 illustrates and expected area to be harvested per day.

Figure 18:
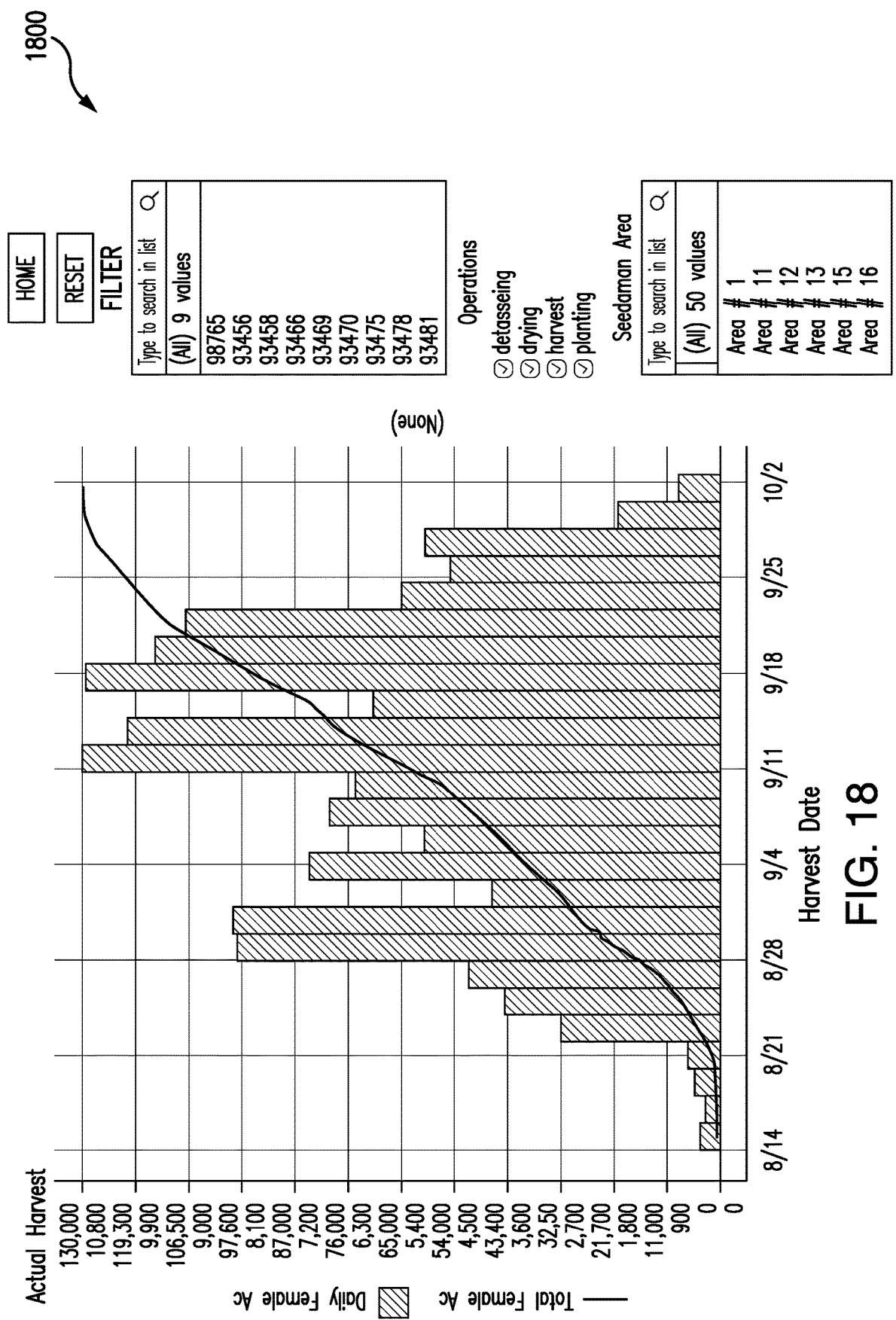
Figure 18:
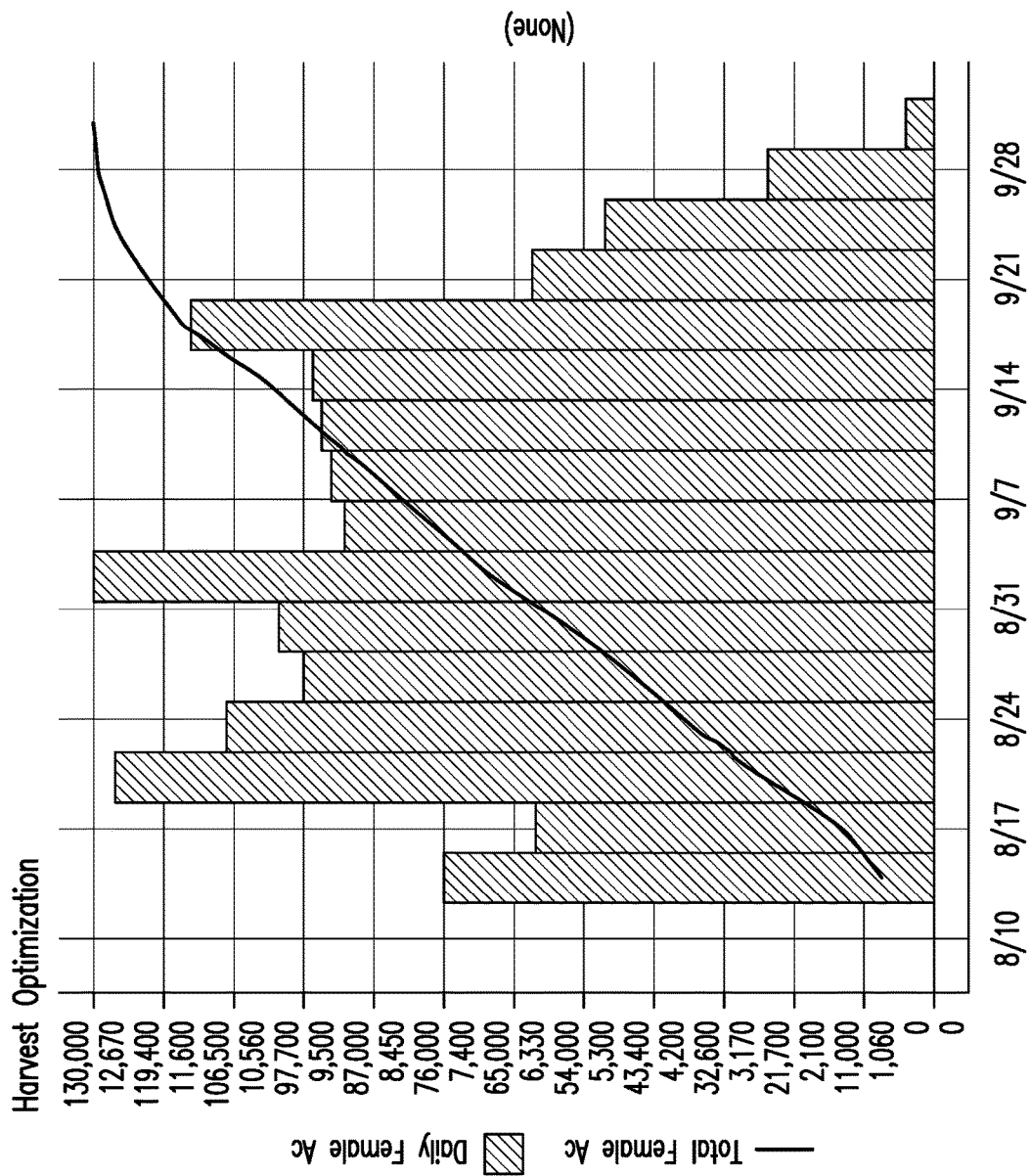

And, FIGS. 18 and 19 illustrate example interfaces that may be displayed to the user, in connection with implementation of the generated harvest plan (e.g., based on a selection from the dashboard interface 600 or from the dashboard interface 900 or from another dashboard interface, based on a selection from the interface 700, based on a selection from the interface 800, etc.), to illustrate comparison between the harvest plan and actual harvest output for the fields in the harvest plan (e.g., as of a date of generation of the given harvest plan, etc.). In connection therewith, FIG. 18 illustrates interface 1800, which includes a graphical representation of actual daily harvest totals versus total, optimized harvest based on the generated harvest plan (e.g., including for the site or field scenario 102 and other sites included in the harvest plan, etc.). It should be appreciated that the data in the interface 1800 may be represented by individual field, batch, or total site. And, the interface of FIG. 19 includes a tabular representation of actual daily harvest totals versus total, optimized harvest (based on the generated harvest plan) for various fields in the harvest plan. In connection therewith, the interface of FIG. 19 includes an entry for each of the fields, identifying the particular plant/crop in the field, the particular field (e.g., by field ID, etc.), the number of acres harvested for the given field, a target yield for the given field (in SSU, based on the harvest plan), and an actual yield per acre (in SBU). The interface of FIG. 19 then further includes a ratio (as a percentage in this example) comparing the actual yield for each field to the target yield (e.g., as an indication of accuracy of the harvest plan, etc.).

With reference again to FIG. 5, in connection with implementation of the harvest plan (at step 522 of the method 500), the platform 112 receives feedback from the field sites (e.g., field 104*a* harvest complete, yield from field 104*a*, field 104*d* partially harvested, rain—no harvest of field 104*c*, picker 106*d* down for maintenance, etc.) relating to actual harvest of fields included in the harvest plan (e.g., in accordance with the given harvest plan, etc.), relating to supply and demand mismatch data due to non-adherence of the schedule/harvest plan at some of the sites, or due to logistics data (e.g., resources (e.g., pickers, dryers, choppers (at the front end of the facility, etc.), etc.) and/or harvest lines not available (e.g., break down or busy, etc.), etc.), etc. In turn, the platform 112 consumes, receives, inputs, etc. such feedback and updates, at 526, the data in the data structure 118, generally, to reflect the conditions and statuses of the resources included in or at the different sites.

Thereafter, the method 500 returns to step 502, whereby the method 500 may be repeated. It should be appreciated that the platform 112 may repeat the method 500 at any suitable interval. For example, the platform 112 may generate a harvest plan (as stored at 520) daily, or weekly. In one specific example, the platform 112 generates a harvest plan at 3:00 AM each active day during a harvest season, and provides the harvest plan to the sites. In doing so, the interfaces may be updated to account for the new harvest plan. Further, the platform 112 in turn updates data in the data structure 118 at the end of the day, or prior to 3:00 AM the next day, to ensure and/or aid in providing an up-to-date harvest plan. Further, it should be appreciated that as the number of fields that are harvested during the harvest time increases, the number of fake pickers decreases, and the number of potential allocations also decreases. Each time the harvest plan is generated, the platform 112 stores the harvest plan and implements the same at the various sites until the harvest is complete.

It should be noted that in FIG. 5, the method 500 employs an iterative sequence to add constraints to the potential allocations of pickers, resources, etc. at specific times, to the sites/fields. In this manner, depending on the processing available in the computing device embodying the platform 112, the harvest plan may be generated in hours (rather than days in certain examples). That said, as processing capabilities increase, the number of iterations and/or the manor of adding the constraints to the generation of potential allocations may be different. In at least one embodiment, the constrains in the method 500 may be applied together, where each stage is expressed as a term in a cost function.

As described, the systems and methods herein provide for identification of a harvest plan, in an automated fashion, whereby the harvest plan may be identified consistent with the various constraints and/or objectives included herein. It should further be appreciated that, despite the iterative process illustrated in FIG. 5, the harvest plan may be determined in a single stage subject to all of the constraints listed and/or contemplated above. That said, the platform 112 and/or the decision service 120 may be limited and/or restricted in available resources, whereby processing time associated with determining the harvest plan in such a single stage may be acceptable or not acceptable (and may be time consuming, resource consuming, etc.). What's more, it may be difficult to accurately determine an optimum (or even reasonable) combination of such resources in developing a harvest plan, when a large number of options are available.

For example, in a situation with around 1,700 fields, around 80 pickers, around 9 sites in which the fields and pickers are organized, and hundreds of products for harvest across the fields (where plant moisture may vary at a continuum between about 50% down to about 20%), a harvest plan spanning around 8-10 weeks may have hundreds of millions of potential combinations for harvest. As can be seen from this example, the selection of such a harvest plan involves substantial complexity. That said, through an integrated model, an optimized harvest plan may be identified for this example in between around 20 and around 24 hours for given resources associated with the platform 112 and/or the decision service 120. While, again, this may be acceptable in certain implantations, in others it may not (e.g., this timing may be too long to effectively implement for harvesting taking into account changes in weather, crop dry-down rates, duration of harvest seasons, etc.). As such, the method 500 is provided whereby the determination of the harvest plan is divided into multiple stages, whereby an iterative approach is defined. Under this approach, given the above example, and given consistent resources for the platform 112 and/or the decision service 120, the harvest plan may be determined in about 2 hours. In an implementation where the harvest plan is determined and/or identified daily, the iterative approach exemplified in method 500 may be preferred. The reduction in the processing time, for the iterative process, is provided due to the reduction in decisions associated with the potential allocations of resources for the given harvest plan. That is, for example, in stage (1) above, the pickers are assigned to fields, but the particular times of the pickers harvesting the fields are left undefined in the potential allocations.

It should be appreciated that whether a single stage or a multi-stage (iterative approach) is employed, is dependent on the particular implementation and/or the number of fields, pickers, dryers, etc. and/or available resources associated with the platform 112 and/or the decision service 120, etc.

Additionally, by accurately harvesting crops at the appropriate moisture content, based on the identified harvest plan, may confirm accuracy of the identified harvest plan. For instance, performance of the identified harvest plan may be assessed based on harvest of the crops at particular moisture contents, as targeted via the description above. Or, the identified harvest plan may be evaluated based on a variety of criteria, individually or in combination, including batch length, moisture, yield, quality, priority, demand, field spacing and/or travel per picker, etc. or other metrics indicative of a successful harvest of the crops and/or utilization of the available resources, etc. Further, the harvest plans may be judged relative to other harvest plans, determined/generated in a consistent manner or differently, and/or relative to historical data relating to harvest.

Moreover, it should also be appreciated that the systems and methods herein are applicable to any desired crop. Moreover, it should be appreciated that the systems and methods herein may also be applied to other data, including environmental data (e.g., soil properties, temperature, and weather, etc.) used for environmental analysis, biological data used for product performance analysis, etc.

In view of the above, the systems and method herein provide for advance generation of harvest plans for different sites, subject to different constraints and resources. That said, harvest operations in product supply are complex tasks that require coordination and planning among several individuals, systems (data, information, and equipment) and other factors such as weather, supply, and demand. The number of plants creates complexity, especially in the context of tens, or hundreds of pickers, and hundreds or thousands of fields (including about ninety pickers and one thousand eight hundred fields, in one example), etc. Consequently, crop yield is a function of specific hybrids, growing conditions (e.g., management practices employed by the grower, weather conditions during the growing season of the crop and also during the harvest window, kernel moisture content, type of harvest (ear picking vs. combining), etc.).

The timing and ordering of the fields to harvest the hybrid (broadly crops) is instructed by the readiness for harvest, which is generally linked to moisture content, existing supply and projected demand of a given hybrid across the system, availability of harvesting equipment such as a picker or a combine, etc. And, also, once the fields are harvested the material (ear of corn with kernels, or shelled corn, or any other crop derivatives) are transported to the manufacturing sites where they are further processed. Hence, the site capacity (e.g., dryer capacity, etc.) is a relevant consideration. Ones of these aspects that influence the timing and ordering are addressed in combination in the systems and methods herein.

It should also be appreciated that the systems and methods herein implement, and/or are implemented in connection with, various new and unique interfaces through which data is provided to (e.g., displayed to, etc.) users (e.g., at computing devices associated with the users, etc.) in new and different ways (for example, via the interfaces of FIGS. 6-19, etc.). In doing so, the interfaces provide for particular manners of presenting information from the generated planting plans to users so that the users can readily understand, appreciate, etc. what actions are required to carry out the harvest plan (and achieve harvest optimization, etc.), in view of the fields required to be harvested and the resources available to perform the harvesting (and subsequent processing) operations. In this way, the interfaces provide particular, limited agricultural data (more specifically, harvest data) to the users in specific manners (beyond conventional user interface methods). Further, the interfaces may be individualized to the users to provide up-to-date information regarding implementation of the given harvest plan as well as detailed information as to which fields should be harvested to carry out the given plan. What's more, the interfaces are dynamic in that they may be updated to account for changes in harvested fields, availability of resources, etc., as new harvest plans are generated.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof (e.g., to adjust or adopt or scale yield data collected at pickers (broadly, harvesters or harvesting machines) to account for errors in calibration (where such adjustment may be performed or achieved at computing devices located away from the pickers, etc.), etc.), wherein the technical effect may be achieved by performing at least one (or more) of the following operations: (a) retrieving, by a platform computing device, from a data structure, data specific to a harvest project, the harvest project including at least one site, the at least one site including multiple fields, and wherein the data includes identifying data for the multiple fields, location data for the multiple fields and multiple pickers, and moisture content(s) for one or more crops included in the multiple fields; (b) for each of at least one stage, for each site of the at least one site: (i) determining, by the platform computing device in communication with the data structure, via a decision service, multiple potential allocations of the multiple pickers to the multiple fields of the at least one site based on the retrieved data and one or more applicable constraints; (ii) determining, by the platform computing device, a parameter of the multiple potential allocations; (iii) advancing, by the platform computing device, one or more of the multiple potential allocations, based on the determined parameter; (iv) imposing, by the platform computing device, at least one constraint consistent with ones of the one or more advanced potential allocations; (c) further determining, by the platform computing device in communication with the data structure, via the decision service, at least one allocation of the multiple pickers to the multiple fields based on the retrieved data and one or more applicable constraints; (d) storing, by the platform computing device, in memory associated with the platform computing device, a harvest plan for the harvest project, based on the at least one allocation of the multiple pickers to the multiple fields; and (e) implementing, at least in part, by the platform computing device, the harvest plan in the multiple fields, whereby the multiple pickers are directed to the multiple fields consistent with the harvest plan for harvesting the one or more crops included in the multiple fields.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above mentioned advantages and improvements and still fall within the scope of the present disclosure.

The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in allocating resources in harvest operations involving multiple fields and multiple pickers, the method comprising:
   (a) retrieving, by a platform computing device, from a data structure, data specific to a harvest project, the harvest project including at least one site, the at least one site including multiple fields, and wherein the data includes identifying data for the multiple fields, location data for the multiple fields and multiple pickers, and moisture content(s) for one or more crops included in the multiple fields;
   (b) for each of at least one individual site stage, for each site of the at least one site, where the at least one individual site stage is applicable to each site of the at least one site:
      determining, by the platform computing device in communication with the data structure, via a decision service, multiple potential allocations of the multiple pickers to the multiple fields of the at least one site based on the retrieved data and one or more applicable constraints;
      determining, by the platform computing device, a first parameter of the multiple potential allocations;
      advancing, by the platform computing device, one or more of the multiple potential allocations, based on the determined first parameter; and
      imposing, by the platform computing device, at least one first constraint consistent with ones of the advanced one or more of the multiple potential allocations; and then
   (c) further determining, by the platform computing device in communication with the data structure, via the decision service, at least one allocation of the multiple pickers to the multiple fields based on the retrieved data and the at least one first constraint;
   (d) for at least one all-site stage and for each site of the at least one site, where the at least one all-site stage is applicable to each site of the at least one site:
      determining, by the platform computing device, a second parameter of the at least one allocation of the multiple pickers for each site of the at least one site;
      advancing, by the platform computing device, one or more of the at least one allocation, based on the determined second parameter of the at least one allocation; and
      imposing, by the platform computing device, at least one second constraint consistent with the advanced one or more of the at least one allocation;
   (e) determining, by the platform computing device, via the decision service, at least one final allocation for the at least one site, based on the retrieved data and the at least one second constraint;
   (f) storing, by the platform computing device, in memory associated with the platform computing device, a harvest plan for the harvest project, based on the at least one final allocation of the multiple pickers to the multiple fields; and
   (g) sending, by the platform computing device, the harvest plan to the multiple pickers, which causes the multiple pickers to travel to the multiple fields and to automatically harvest, based on GPS included in the multiple pickers, one or more crops in the multiple fields, consistent with the harvest plan.

2. The computer-implemented method of claim 1, wherein the at least one individual site stage includes multiple individual site stages.

3. The computer-implemented method of claim 2, wherein the determined first parameter includes at least one of a number of fake pickers included in the multiple potential allocations, a batch duration of the multiple potential allocations, a timing of harvest associated with ones of the multiple fields of the multiple potential allocations; and an expected yield of the multiple potential allocations.

4. The computer-implemented method of claim 1, wherein the imposed at least one first constraint includes: ones of the multiple pickers assigned to ones of the multiple fields, a limit on batch durations of the multiple potential allocations, a precedence associated with ones of the multiple fields within the at least one site, and/or a lower bound on a yield of the multiple potential allocations.

5. The computer-implemented method of claim 1, wherein the imposed at least one first constraint includes at least one or more of the following:

$$\sum_{\forall b \in batches} SAPBatchDuration_b \geq \emptyset$$

where $\emptyset$ is a parameter;

$$\sum_{f \in fields, pushDays_f = 0, t \in harvestTime_f, t < Mp_f - pushDays_f} MPBin_f \leq$$

$$|\{f \mid f \in fields: pushDays_f = 0\}|;$$

-continued and/or $$realVolDiffPos_{hl} \geq supply_{lh} -$$
$$\sum_p \sum_f \sum_t yieldMoisture_{ft} \times acres_f \times dailyHarvestHrs \times pickerSpeed \times$$
$$harvestFraction_{pft} \forall\ h \in hybrids,\ l \in demandLevels.$$

6. The computer-implemented method of claim 1, further comprising:
  determining, by the platform computing device, a third parameter of the at least one final allocation for each site of the at least one site; and
  advancing, by the platform computing device, one or more of the at least one final allocation, based on the determined third parameter of the at least one final allocation for each site of the at least one site; and
  wherein storing the harvest plan for the harvest project is based on the advanced one or more of the at least one final allocation.

7. The computer-implemented method of claim 6, wherein the determined second parameter of the at least one allocation of the multiple pickers for each site of the at least one site and/or the determined third parameter of the at least one final allocation for each site of the at least one site includes at least one of: a shortfall between an expected yield and a demand for the multiple potential allocations and a start time for batches included in the multiple potential allocations.

8. The computer-implemented method of claim 1, wherein the imposed at least one first constraint includes a balance of supply and demand for the multiple potential allocations.

9. The computer-implemented method of claim 1, wherein the multiple pickers include corn ear pickers and/or combines.

10. The computer-implemented method of claim 1, wherein the decision service includes a mixed integer programming model based on an objective function and the one or more applicable constraints, and wherein the one or more applicable constraints are represented as linear inequalities.

11. The computer-implemented method of claim 1, further comprising updating the data included in the data structure for a harvest interval, and then repeating steps (a) through (g) at one or more regular intervals.

12. The computer-implemented method of claim 1, further comprising harvesting, by the multiple pickers, the one or more crops included in the multiple fields based at least in part on the harvest plan.

13. A non-transitory computer-readable storage medium including executable instructions for allocating resources in harvest operations involving multiple fields and multiple pickers, which when executed by at least one processor, cause the at least one processor to:
  retrieve, from a data structure, data specific to a harvest project, the harvest project including multiple sites, and the multiple sites including multiple fields, and wherein the data includes identifying data for the multiple fields, location data for the multiple fields and multiple harvesting machines, and moisture content(s) for one or more crops included in the multiple fields;
  for each of at least one individual site stage, for each site of the multiple sites, where the at least one individual site stage is applicable to each site of the multiple sites:
    determine, via a decision service, multiple potential allocations of the multiple harvesting machines to the multiple fields based on the retrieved data and one or more applicable constraints;
    determine a first parameter of the multiple potential allocations;
    advance one or more of the multiple potential allocations, based on the determined first parameter; and
    impose at least one first constraint consistent with ones of the advanced one or more of the multiple potential allocations; and then
  further determine, via the decision service, at least one allocation of the multiple harvesting machines to the multiple fields based on the retrieved data and the at least one first constraint;
  for at least one all-site stage and for all of the multiple sites, where the all-site stage is applicable to all of the multiple sites:
    determine a second parameter of the at least one allocation of the multiple pickers for all of the multiple sites;
    advance one or more of the at least one allocation, based on the determined second parameter of the at least one allocation for all of the multiple sites; and
    impose at least one second constraint consistent among the advanced one or more of the at least one allocation;
  determine, via the decision service, at least one final allocation for the multiple sites, based on the retrieved data and the at least one second constraint;
  store, in memory associated with the at least one processor, a harvest plan for the harvest project, based on the at least one final allocation of the multiple harvesting machines to the multiple fields of the multiple sites; and
  send the harvest plan to the multiple pickers, which causes the multiple pickers to travel to the multiple fields and to automatically harvest, based on GPS included in the multiple pickers, one or more crops in the multiple fields consistent with the harvest plan.

14. The non-transitory computer-readable storage medium of claim 13, wherein the imposed at least one first constraint includes at least one or more of the following:

$$\sum_{\forall b \in batches} SAPBatchDuration_b \geq \emptyset$$

wherein $\emptyset$ is a threshold parameter;

$$\sum_{f \in fields, pushDays_f = 0,\ t \in harvestTime_f,\ t < M p_f - pushDays_f} MPBin_f \leq$$
$$|\{f\ |\ f \in fields: pushDays_f = 0\}|;$$

and/or $$realVolDiffPos_{hl} \geq supply_{lh} -$$
$$\sum_p \sum_f \sum_t yieldMoisture_{ft} \times acres_f \times dailyHarvestHrs \times pickerSpeed \times$$
$$harvestFraction_{pft} \forall\ h \in hybrids,\ l \in demandLevels.$$

15. A system for use in allocating resources in harvest operations involving multiple fields and multiple harvesting machines, the system comprising at least one computing device configured to:
retrieve, from a data structure, data specific to a harvest project, the harvest project including at least one site, the at least one site including multiple fields, and wherein the data includes identifying data for the multiple fields, location data for the multiple fields and multiple harvesting machines, and moisture content(s) for one or more crops included in the multiple fields;
for each of at least one individual site stage, for each site of the at least one site, where the at least one individual site stage is applicable to each site of the at least one site:
 determine, via a decision service, multiple potential allocations of the multiple harvesting machines to the multiple fields of the at least one site based on the retrieved data and one or more applicable constraints;
 determine a first parameter of the multiple potential allocations;
 advance one or more of the multiple potential allocations, based on the determined first parameter; and
 impose at least one first constraint consistent with ones of the advanced one or more of the multiple potential allocations; and then
further determine, via the decision service, at least one allocation of the multiple harvesting machines to the multiple fields based on the retrieved data and the at least one first constraint;
for at least one all-site stage and for each site of the at least one site, where the at least one all-site stage is applicable to each site of the at least one site:
 determine a second parameter of the at least one allocation of the multiple harvesting machines for each site of the at least one site;
 advance one or more of the at least one allocation, based on the determined second parameter of the at least one allocation; and
 impose at least one second constraint consistent among the advanced one or more of the at least one allocation;
determine, via the decision service, at least one final allocation for the at least one site, based on the retrieved data and the at least one second constraint;
store, in memory associated with the computing device, a harvest plan for the harvest project, based on the at least one final allocation of the multiple harvesting machines to the multiple fields; and
send the harvest plan to the multiple harvesting machines, which causes the multiple harvesting machines to travel to the multiple fields and to automatically harvest, based on GPS included in the multiple harvesting machines, one or more crops in the multiple fields consistent with the harvest plan.

16. The system of claim 15, further comprising the multiple harvesting machines; and
wherein the multiple harvesting machines are configured, by the harvest plan, to harvest the one or more crops included in the multiple fields consistent with the harvest plan.

17. The non-transitory computer-readable storage medium of claim 13, wherein the imposed at least one first constraint includes a balance of supply and demand for the multiple potential allocations for all of the multiple sites.

18. The non-transitory computer-readable storage medium of claim 13, wherein the executable instructions, when executed by the at least one processor, further cause the at least one processor to:
determine a third parameter of the at least one final allocation for the multiple sites; and
advance one or more of the at least one final allocation, based on the determined third parameter of the at least one final allocation for the multiple sites; and
wherein the executable instructions when executed by at least one processor, cause the at least one processor, in storing the harvest plan, to store the harvest plan for the harvest project based on the advanced one or more of the at least one final allocation.

19. The non-transitory computer-readable storage medium of claim 18, wherein the determined second parameter of the at least one allocation and/or the determined third parameter of the at least one final allocation includes at least one of: a shortfall between an expected yield and a demand for the multiple potential allocations for all of the multiple sites and a start time for batches included in the multiple potential allocations for all of the multiple sites.

* * * * *